US006749903B2

(12) United States Patent
Weiss et al.

(10) Patent No.: US 6,749,903 B2
(45) Date of Patent: Jun. 15, 2004

(54) ELECTRON BEAM APPARATUS HAVING A LOW LOSS BEAM PATH

(75) Inventors: Douglas Eugene Weiss, Golden Valley, MN (US); James Patrick DiZio, Saint Paul, MN (US); Harvey William Kalweit, Burnsville, MN (US); Roy G. Schlemmer, Oakdale, MN (US); Bruce Alan Sventek, Saint Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/245,208

(22) Filed: Sep. 17, 2002

(65) Prior Publication Data

US 2003/0094582 A1 May 22, 2003

Related U.S. Application Data

(62) Division of application No. 09/386,735, filed on Aug. 31, 1999, now abandoned.

(51) Int. Cl.[7] .............................. B05D 3/06; C08F 2/54

(52) U.S. Cl. ....................... 427/496; 427/501; 427/505; 427/596; 427/551

(58) Field of Search ................................ 427/496, 492, 427/493, 505, 500, 501, 502, 551, 596, 569; 250/492.3; 313/420

(56) References Cited

U.S. PATENT DOCUMENTS

| | | | | |
|---|---|---|---|---|
| 3,418,155 A | | 12/1968 | Colvin et al. | 117/93.31 |
| 3,916,204 A | * | 10/1975 | Swartz | 250/492.3 |
| 4,140,129 A | | 2/1979 | Heinz et al. | |
| 4,193,043 A | | 3/1980 | Brau et al. | 331/94.5 |
| 4,246,297 A | | 1/1981 | Nablo et al. | 427/44 |
| 4,362,965 A | | 12/1982 | Kendall | 313/420 |
| 4,494,036 A | | 1/1985 | Neukermans | 313/420 |
| 4,631,444 A | | 12/1986 | Cheever | 313/420 |
| 5,147,711 A | | 9/1992 | Shurter | 428/216 |
| 5,266,400 A | | 11/1993 | Yarusso et al. | 428/345 |

FOREIGN PATENT DOCUMENTS

| | | |
|---|---|---|
| DE | 529237 | 6/1931 |
| EP | 0 453 254 B1 | 6/1997 |
| GB | 301719 | 12/1928 |
| JP | 60231323 | 11/1985 |
| WO | WO94/07248 | 3/1994 |
| WO | WO 94/07248 | 3/1994 |

OTHER PUBLICATIONS

JP 60231323 abstract (Patent abstracts of Japan) Nov. 16, 1988, Takeachi Susumu.

Ueda, K., et al., “An E–Beam Pumped KrF Laser with Novel Long–Life, High Transmitting Foils”, Institute for Laser Science, Univ. of Electro–Communication, Tokyo, Japan, pp. 598–605, no date given, but during or after 1984.

(List continued on next page.)

*Primary Examiner*—Marianne Padgett
(74) *Attorney, Agent, or Firm*—Melanie Gover; Douglas B. Little

(57) ABSTRACT

An apparatus for irradiating an article, particularly a multi-layer article, with electron beam radiation is provided. The apparatus contains a window having a short unit path length and allows for controlled irradiation of an article such that upper portions of the article receive significantly higher electron beam dosages than lower portions of the article. Such differential dosage allows for modification of an article comprising a coating composition that can be modified by electron beam irradiation on a substrate that is vulnerable to degradation from electron beam radiation. A method of irradiating an article with electron beams, and products manufactured using the apparatus and method of the invention, are also disclosed.

11 Claims, 9 Drawing Sheets

OTHER PUBLICATIONS

Kang, M., Weinstein, B., Rose, E., "For Electron–Beam Diode Foils", Los Alamos National Laboratory, Los Alamos, New Mexico, pp. 461–464, no date (but after May 1987).

Weiss, D. E., Kalweit, H. W., Kensek, R. P., "Low–Voltage Electron–Beam Stimulation Using the Integrated Tiger Series Monte Carlo Code and Calibration Through Radiochromic Dosimetry", ACS Symposium Series 620, Irradiation Of Polymers, Fundamentals and Technological Applications, American Chemical Society. 1996, no month, Chapter 8, pp. 110–129 (Symposium Aug. 21–26, 1994).

Nitzl Prof. Dr. K., 7th Munich adhesive–and Processing Seminar, 1982, Finishing and Printing with Chemical and Radiation–Chemical Curing Systems, Karmann, W., "Crosslinking and Curing of Coatings by means of Electron–Accellerators" pp. 2–11, no month.

Karmann, Dr. W., "Determination of Dosage and Penetration Depth of the Radiation by means of an Electron–Accelerator for the Practice", pp. 1–6, no date (but after 1979).

Postma, N. B., Weiss, D. E., Kalweit, H. W., Janus, L. R., "Low Voltage Dosimetry", RadTech '90–North America Radiation Curing Conference and Exposition Proceedings, vol. 2, Mar. 25–29, 1990, pp. 329–340.

Thorburn, B., "Review of a Low Energy Electron Beam System Built in Japan", NHV America. Westford, MA., pp. 411–413, no date (but after or during 1991).

Wakalopulos, G., "Low Voltage or Ultra Low Voltage? The Basics of Electron Beam. What You Need to Know", Radtech Report, Jul./Aug. 1998, pp. 10–15.

Weiss, D. E., Johnson, W. C., Kensek, R. P., "Dose Distributions in Tubing Irradiated By Electron Beam: Monte Carlo Simulation and Measurement", Radiat. Phys. Chem., vol. 50, No. 5, 1997, pp. 475–485, no month.

Anderson, R. G., Shurter, R. P., Rose E. A., "Qualification of Diode Foil Materials for Excimer Lasers", Los Alamos National Laboratory, Los Alamos, New Mexico, pp. 948–950, no date given, but during or after 1984.

Postma, N. B., Weiss, D. E., Kalweit, H. W., Janus, L. R., "Low Voltage Dosimetry", RadTech '90–North America Radiation Curing Conference and Exposition Proceedings, vol. 2, Mar. 25–29, 1990, pp. 329–340.

Thorburn, B., "Review of a Low Energy Electron Beam System Built in Japan", NHV America, Westford, MA., pp. 411–413, no date.

Wakalopulos, G., "Low Voltage or Ultra Low Voltage? The Basics of Electron Beam: What You Need to Know", Radtech Report, Jul./Aug. 1998, pp. 10–15.

Weiss, D. E., Johnson, W. C., Kensek, R. P., "Dose Distributions in Tubing Irradiated By Electron Beam: Monte Carlo Simulation and Measurement", Radiat. Phys. Chem., vol. 50, No. 5, 1997, pp. 475–485, no month.

Anderson, R. G., Shurter, R. P., Rose E. A., "Qualification of Diode Foil Materials for Excimer Lasers", Los Alamos National Laboratory, Los Alamos, New Mexico, pp. 948–950, no date.

Ueda, K., et al., "An E–Beam Pumped KrF Laser with Novel Long–Life, High Transmitting Foils", Institute for Laser Science, Univ. of Electro–Communication, Tokyo, Japan, pp. 598–605, no date.

Kang, M., Weinstein, B., Rose, E., "For Electron–Beam Diode Foils", Los Alamos National Laboratory, Los Alamos, New Mexico, pp. 461–464.

Weiss, D. E., Kalweit, H. W., Kensek, R. P., "Low–Voltage Electron–Beam Simulation Using the Integrated Tiger Series Monte Carlo Code and Calibration Through Radiochromic Dosimetry", ACS Symposium Series 620, Irradiation Of Polymers, Fundamentals and Technological Applications, American Chemical Society, no month, 1996, Chapter 8, pp. 110–129 –Symposium Aug. 21–24, 1994.

Nitzl Prof. Dr. K., 7th Munich Adhesive–and Processing Seminar, 1982, Finishing and Printing with Chemical and Radiation–Chemical Curing Systems, Karmann, W., "Crosslinking and Curing of Coatings by means of Electron–Accellerators" pp. 2–11, no month.

Karmann, Dr. W., "Determination of Dosage and Penetration Depth of the Radiation by means of an Electron–Accelerator for the Practice", pp. 1–6, no month.

* cited by examiner

ELECTRON BEAM APPARATUS HAVING A LOW LOSS BEAM PATH

CROSS REFERENCE TO RELATED APPLICATIONS

This application is a divisional of U.S. Ser. No. 09/386,735, filed Aug. 31, 1999, now abandoned, the disclosure of which is herein incorporated by reference.

FIELD OF THE INVENTION

The present invention is directed to a method and apparatus for electron beam irradiation of a single layer or multi-layer article, and resulting products. More particularly, the invention is directed to use of a low loss electron beam path to irradiate an electron beam modifiable material coated on an electron beam degradable substrate.

BACKGROUND

In recent years, electron beam radiation has increasingly been used for modifying various materials, including polymerizing, crosslinking, grafting, and curing materials. For example, electron beam processing has been used to polymerize and/or crosslink various pressure-sensitive adhesive formulations coated on film substrates, to graft coatings onto substrates, and to cure various liquid coatings, such as printing inks. Using an electron beam to modify a material avoids the need for coating solutions, including those comprising volatile organic compounds ("VOCs"). This allows for a reduction in VOC emissions, and a concurrent reduction in energy costs and environmental or occupational hazards.

Unlike ultraviolet ("UV") radiation, which is also used to crosslink, polymerize, graft, and cure various materials, electron beam radiation does not require the use of an initiator. In addition, electron beam radiation is readily absorbed by all organic materials, even those materials that are not readily modified by UV radiation, such as thick, opaque materials and those that resist UV modification, such as allylic, olefinic, and unsaturated compounds. Polyethylene is an exemplary unsaturated compound that cannot readily be cured by UV radiation, but is curable by electron beam radiation.

Although electron beam radiation has many advantages, it does have some limitations. These limitations include the fact that electron beam generating equipment has traditionally been relatively expensive. The high expense is at least partially associated with the need for large power supplies, lead shielding, high voltage components, and safety monitoring equipment. In recent years, manufacturers have been able to build less expensive, more compact, lighter electron beam equipment by lowering the voltage of the electron beam to 125 kilovolts (kV) or less. For example, Energy Sciences, Inc. of Wilmington, Mass.; Advanced Electron Beam Technologies, Wilmington, Mass.; and American International Technologies, Inc. of Torrance, Calif. are manufacturers of compact, low cost electron beam generators. These machines make it possible to lower the purchase and operating costs of electron beam radiation equipment.

Another significant limitation of electron beam radiation is that electrons frequently penetrate too deeply into the material being irradiated. High voltages are frequently used to obtain a reasonably uniform dose over the entire cross-section of an electron beam modifiable coating, but this can result in a significant amount of energetic electrons passing into layers below the electron beam modifiable coating. This becomes a problem in multi-layer materials that comprise a coating of material that is being modified, and a substrate or backing of material that can be damaged by electron beam radiation. Paper, polyvinyl chloride, polypropylene, and TEFLON are all materials that often are used as substrates for adhesives, yet are susceptible to degradation from electron beam radiation. Electron beam radiation can cause the substrate to become brittle or otherwise degraded. The result is a deteriorated substrate that makes the product either lower quality or unusable for its desired application.

SUMMARY OF THE INVENTION

Existing electron beam generation systems do not adequately address the problems of high machine costs and satisfactorily modifying a coating without degrading the substrate. Consequently, a need exists to control electron beam irradiation such that the electron beam penetration is substantially limited to specific layers of the irradiated material, preferably just the electron beam modifiable coating of the material.

The present invention is directed to an apparatus and method for delivering electron beam radiation to a material, particularly a multi-layer material having an electron beam modifiable coating and an electron beam degradable substrate. The invention is also directed to products manufactured using the apparatus and method of the invention. At least one embodiment of the present invention allows one to control the dose (energy deposited per unit mass) delivered to particular depths in an irradiated material.

One aspect of the invention is directed to an electron beam apparatus comprising an electron beam source, a window proximate the electron beam source comprising a polymeric film having at least two surfaces, a protective layer resistant to free radical degradation on at least one surface of the polymeric window, a support proximate the window on which to place materials to be irradiated by the source, and a gap between the window and support.

Another aspect of the invention is directed to a window for use with an electron beam source comprising a polymeric film having at least two surfaces, the film having a protective layer resistant to free radical degradation on at least one surface wherein the film is able to contain an environment having a pressure of less than $10^{-4}$ Torr. Another aspect of the invention is directed to a method of irradiating an article with an electron beam comprising providing an electron beam source; providing a window for use with the electron beam source, the window comprising a polymeric film having at least two surfaces a protective layer resistant to free radical degradation on at least one surface; and irradiating the article through the window with electrons from the electron beam source.

Another aspect of the invention is directed to a method of modifying the properties of an article having two or more layers comprising providing an article having an electron beam modifiable first layer and an electron beam degradable second layer proximate the first layer; providing an electron beam source for which energy, voltage, and current levels may be adjusted; providing a window between the electron beam source and the article to be irradiated, wherein a gap exists between the window and article, the window having a unit path length of 3 to 50 grams per square meter, setting the electron beam source energy to between 50 and 150 keV; adjusting the electron beam source voltage and current, and adjusting the gap distance between the window and article such that the electron beam can modify the first layer without substantially degrading the second layer, and irradiating the article with an electron beam from the electron beam source.

Another aspect of the invention provides an electron beam modified article comprising an electron beam degradable backing material, and an electron beam modified coating on the backing material, the 30 micrometers of the electron beam degradable backing adjacent the modified coating having absorbed between 0.1 and 40 $mJ/cm^2$ of energy.

Another aspect of the invention provides an electron beam modified article comprising an electron beam degradable backing material, and an electron beam modified coating on the backing material, the modified coating being free of release material contamination. Because the present invention allows an electron beam modifiable layer to be modified, e.g., cured, directly on an electron beam degradable backing without materially degrading the backing, the modifiable layer is not required to be modified on a release material, such as silicone, then transferred to the backing. This eliminated the possibility of the modifiable layer being contaminated with release material.

In irradiating an electron beam modifiable material coated on an electron beam degradable substrate, it is important to provide a dose to, and through, the irradiated material that will adequately modify the modifiable layer so it will be useful for its intended purpose and so it will adhere to the substrate. However, it is important that the dose is not excessive. For example, when an adhesive layer on a substrate is irradiated, the surface dose must be sufficient to impart important adhesive properties such as cohesive and adhesive strength, but the dose should not be so high that it over-modifies, e.g., over-crosslinks, or degrades the adhesive layer (which would limit its adhesive properties). The dose must also be sufficient to modify the adhesive at the adhesive/substrate interface so the adhesive will bond with the substrate. However, the interface dose should not be so high that the substrate is significantly degraded.

The electron beam apparatus of the present invention includes an electron beam source configured and arranged to direct electrons into a material, most suitably a multi-layer material having both an electron beam modifiable upper layer and a electron beam degradable lower layer. In traveling from the electron beam source, the electrons pass from a vacuum environment through a window foil having low electron absorbency properties (a "low loss" window) into an atmospheric pressure environment containing the material to be irradiated. The route of the electron beam from its source, through the low loss window, to the irradiated material is sometimes referred to herein as the low loss path. By using a low absorbency window, even a relatively low voltage electron beam can pass through the window with only a slight reduction in power. The resulting electron beam is able to enter and modify the coating of the irradiated material, preferably without entering and degrading any substrate.

Appropriate window materials for use in the low loss path include polymeric films, such as polyimide films. A protective layer is placed on at least the window surface facing the atmospheric pressure environment to reduce free radical degradation and thus improve performance and durability. The protective layer may be a thin layer of aluminum or other metal that protects against free-radical degradation. Preferably it also enhances electrical and thermal conduction along the film.

After the electrons pass through the window, they travel through a gap between the window and the material being irradiated. The gap normally contains nitrogen gas or another inert material maintained at approximately atmospheric pressure. The gap distance is preferably minimized to increase the dosage of electron beam radiation delivered to the modifiable coating and to reduce the dosage absorbed by electrons in the gap. Reducing the gap distance also improves the energy efficiency of the apparatus such that lower voltages may be used to irradiate a material. The gap between the window and the irradiated material is between about 2 and 100 millimeters in certain embodiments, between 4 and 50 millimeters in other embodiments, and between about 5 and 20 millimeters in yet other embodiments. The preferable gap size will depend on factors such as the window material, the presence of a window clamp structure, the voltage used, and the thickness of the modifiable layer.

The amount of electron energy absorbed by the window, gap, coating layer, and any substrate layer as the electron beam travels through these regions can be determined and plotted on a depth/dose curve, which plots dose absorbed against distance from the electron beam source. The dimensions of the curve may vary depending on numerous conditions, but it will typically have a peak where energy absorption is the greatest. In conventional electron beam systems, this peak often exists in the window or gap region. The ideal depth/dose curve would have a square wave shape such that the window and gap absorbed no energy, the modifiable material layer absorbs a uniform amount of energy through its total depth and the degradable substrate absorbed no energy.

A principle advantage of the low loss beam path is that it can shift the absorption peak, also referred to in the art as "back scatter" peak, of the depth/dose curve out of the window/gap region and into the coating layer region such that the depth/dose curve better approximates the ideal square wave curve. At the same time, the lower voltage permitted by the low loss beam path characteristically produces a depth/dose curve having a steep negative slope over the remaining depth of penetration subsequent to the absorption peak. Accordingly, appropriate selection of window materials and gap distances allows the generation of a depth/dose curve having a declining slope that may closely coincide with the interface between the substrate and the coating.

Per the present invention, the electron beam radiation dosage may rapidly diminish upon entry into the irradiated material such that the dose received by a coating may be significantly more than that received by a substrate. The proportion of the total dose received by the substrate is affected by factors such as the shape of the depth/dose curve, the window material, the gap distance, the voltage required to achieve satisfactory modification of the coating, and the thickness of the substrate. In some embodiments the dose may be 1 to 5 times greater at the coating surface than at the coating/substrate interface. The acceptable surface to interface dose ratio will largely depend on the amount of radiation the coating layer can receive without becoming degraded or over-modified, e.g., over-crosslinked.

Conventional electron beam paths, e.g., those with a 12 micrometer titanium window, operating at voltages above approximately 150 kV, generally produce relatively flat, wide depth/dose curves. When a high surface dose is used, the substrate may suffer a substantial amount of degradation because the interface dose and total dose to the substrate will typically increase as the surface dose increases. The inventors have found, surprisingly, that a low loss beam path can have a relatively high but narrow depth/dose curve such that a high surface dose does not necessarily result in a high interface dose. Accordingly, an electron beam modifiable layer, such as an adhesive, can be successfully modified with an electron beam dose that is as much as 5 times greater at the coating surface than at the coating/substrate interface. Because of the shape and placement of the depth/dose curve produced with a low loss path, a sufficient dose can be provided to the adhesive layer, and the interface can be sufficiently modified to adhere to the adjacent substrate, with minimal electron beam penetration into the substrate.

To improve upon the predictability of the dose of electron beam radiation at varying depths in the irradiated material, a Monte Carlo code can be used to predict depth and dose values based upon the window material and the gap distance. These predictions facilitate adjustment of the electron beam dose at various depths in the irradiated material, and allow for optimal dosage delivery and modification of a coating without damage to the substrate. The electron beam radiation used to irradiate the coated substrate preferably operates at a voltage of about 30 to 150 kV, more preferably about 50 to 100 kV, and most preferably about 50 to 75 kV. Selection of voltage can determine the shape of the depth/dose profile (and therefore the ratio of surface to interface doses). Selection of current can determine the actual dose delivered to the irradiated material. Adjusting the current can, for example, change the interface dose.

The invention is further directed to a product, specifically an electron beam modified article. A product may comprise one or more electron beam modifiable layers. In some embodiments, the article comprises one or more electron beam modified coating layer(s) on an electron beam degradable substrate. The invention includes embodiments wherein an electron beam degradable substrate shows acceptable, minimal, or no electron beam degradation after being irradiated. The targeted interface dose is one that would produce minimal degradation while allowing the coating to adhere to the substrate such that a viable tape product is prepared.

The above summary is not intended to describe every embodiment of the present invention. Other aspects and advantages of the invention will become apparent upon reading the following description of drawings and detailed description.

DETAILED DESCRIPTION

One aspect of the present invention is directed to an apparatus for electron beam irradiation of a material. The invention is also directed to a method of irradiating a material, including a multi-layer material that has a coating suitable for electron beam irradiation and a substrate that is susceptible to damage from electron beam irradiation. The invention allows irradiation of the coating sufficient to promote a beneficial modification of the material, such as curing, grafting, polymerizing and/or crosslinking, without excessive irradiation or degradation of the substrate.

Figure 1:
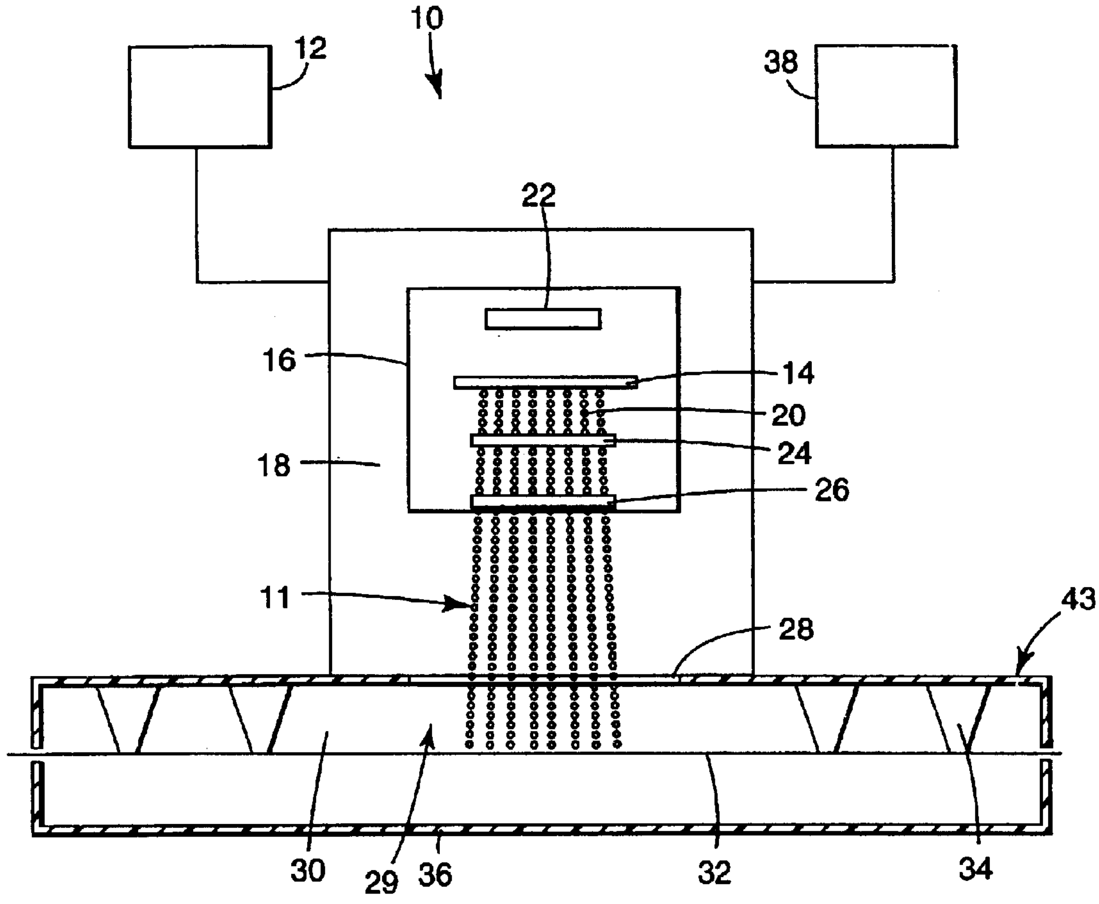
FIG. 1 is a detailed illustration of a cross-section of an electron beam source constructed and arranged in accordance with an embodiment of the invention.

FIG. 1 provides a detailed representation of an apparatus constructed in accordance with the invention, including electron beam source 10 (a single e-beam source is represented). Source 10 produces electron beam 11 (e-beam) when high voltage from high voltage power supply 12 is applied to heated tungsten wire filaments 14 inside electron gun assembly 16. Gun assembly 16 is positioned within vacuum chamber 18 maintained at less than about $10^{-4}$ Torr and preferably at less than about $10^{-6}$ Torr.

Tungsten wire filaments 14 produce electrons 20 that are guided by repeller plate 22 and extractor grid 24, in the form of beam 11, i.e., a collection of accelerated electrons. Repeller plate 22 is typically maintained at a negative charge potential to repel and accelerate electrons 20 toward extractor grid 24. Electrons 20 are accelerated by the beam voltage, i.e., the difference in voltage between extractor grid 24 and ground. For example, an applied beam voltage of 70 kilovolts (kV) imparts energy of 70 kiloelectron volts (keV) to each electron accelerated across the potential between the ground and the extractor grid 24.

Electron beam 11 is guided toward terminal grid 26 and subsequently toward window 28 through which the electrons exit chamber 18 and pass into gap 29. Gap 29 contains atmosphere 30. After passing through atmosphere 30, the electrons travel into material 32 positioned proximate window 28. A moving support (not shown), sometimes referred to as a web, carries material 32 past window 28. Atmosphere 30 in gap 29 is preferably kept substantially oxygen-free by the influx of nitrogen from nitrogen nozzles 34. Beam collector 36 collects any residual electrons. E-beam processing can be extremely precise when under computer control 38.

The present invention provides an improved method and apparatus for controlling the penetration of electrons from electron beam source 10 into material 32. In doing so, the invention permits improved control of the dose of electrons absorbed by specific portions of material 32. The invention identifies and takes advantage of the unexpected finding that by using low energy electron beams along with a low loss beam path, it is possible to identify parameters where satisfactory coating doses can be achieved with a minimum of electron beam penetration into a substrate. In other words, the present invention allows for a relatively high dose of electrons at the upper portion of the irradiated material, and a relatively low dose of electrons in the lower portion of the irradiated material.

The relatively high dose delivered to the coating material, along with the low dose delivered to the substrate material is achieved by providing an apparatus that contains low loss window 28. In addition, gap 29 is preferably small enough to further reduce energy absorption by atmosphere 30. The combined use of low loss window 28 and gap 29 allows the defining of optimum depth/dose relationships through irradiated materials having varying layered constructions, including bi-layer constructions, such as a tape product. Reducing absorption of electrons in gap 29 by reducing the size of gap 29 also improves efficiency. This effect is most pronounced when using beam voltages below 125 keV because, in that range, the gap accounts for a greater percentage of energy absorbed regardless of the window material. The distance of gap 29 between window 28 and material 32 in conventional electron beam generators can be from about 2 to 100 millimeters. Adding a spacer element (not shown) can place the window closer to the coating surface to achieve a specified gap. A spacer element may be positioned between window 28 and the vacuum chamber 18 to lower window 28 or between material 32 and beam collector 36 to raise material 32 closer to the window, both of which will reduce the size of gap 29. A spacer element may be anything that effectively decreases the distance between window 28 and material 32. Typically it is a metal frame shaped to fit between window 28 and vacuum chamber 18. The spacer element can typically reduce the atmospheric gap of conventional processing equipment from as much as 5 cm to as little as 4 mm or less. Adjusting the size of the gap can fine tune the position of the depth/dose curve (especially the absorption peak) in relation to the position of material 32. The optimal gap size will depend on many factors such as type of window, voltage used, material being irradiated. Typically, a preferable gap size for the present invention is from 2 to 50 mm, more preferably 4 to 10 mm. The general shape of a depth/dose curve is largely a function of the electron accelerating voltage, which is selected to provide adequate modification to material 32 so the material meets the requirements of a specific application.

Unit path length is the density of a material (grams per cubic centimeter (g/cc)) penetrated by an electron beam times the distance (micrometers) being traversed (typically the thickness of the material) expressed in units of grams per square meter (gsm). For example, the unit path length of nitrogen gas at standard temperature and pressure, having a density of about 0.00125 g/cc is 5 gsm for a gap thickness of 4 mm, 25 gsm for a gap of 20 mm, and 62.5 gsm for a gap of 50 mm. A nominally 12 $\mu$m titanium window has a unit path length of 54 gsm. As can be seen, a large air gap can more significantly reduce the penetration of electrons at low voltages than a conventional titanium window.

Unit path length is conveniently used to compare relative mass stopping power of various combinations of materials (having different densities and thicknesses) on a single scale for a specific voltage. Mass stopping power is the mean energy loss per unit path length. The mass stopping power of a material traversed by an accelerated electron is affected by beam voltage. Generally mass stopping power is also directly related to the density, thickness, and atomic number of the materials being traversed by the electron beam. In the present invention, these materials could include the low loss window, the gap, the coating, and the substrate.

The present invention provides an apparatus and method that enhances the ability to control the depth/dose profiles of electron beams in general, and in particular low voltage electron beams with energies below 150 keV, including electron beams with energies even below 75 keV. In general, this is done by decreasing the amount of electron beam energy absorbed before it reaches the material to be irradiated. The invention provides a low loss window, preferably comprising a polymeric material, and teaches how the window, in combination with a controlled gap size, can allow for significant, and advantageous, alterations or adjustments in depth/dose profiles through an irradiated material. Through use of a gap having a specified unit path length and a window material having a smaller path length than that of, e.g., a conventional nominally 12 micrometer thick titanium windows, the shape of the depth/dose profile can be altered to make available a greater percentage of electron beam energy for modifying the electron beam modifiable coating while avoiding significant degradation in the underlying electron beam degradable substrate. For example, an aluminum vapor coated nominally 25 micrometer thick polyimide window used with a 2 mm thick nitrogen gap allows twice as much energy to reach the coating surface at an operating voltage of 90 kV than a nominally 12 micron thick titanium window used with a 5 cm nitrogen gap at 125 kV. The metal vapor coating on the polyimide has a negligible effect on the unit path length because the coating is very thin (about 100 nanometers) and thus has an insignificant unit path length (less than 0.5 gsm for each surface that is coated).

Figure 2:
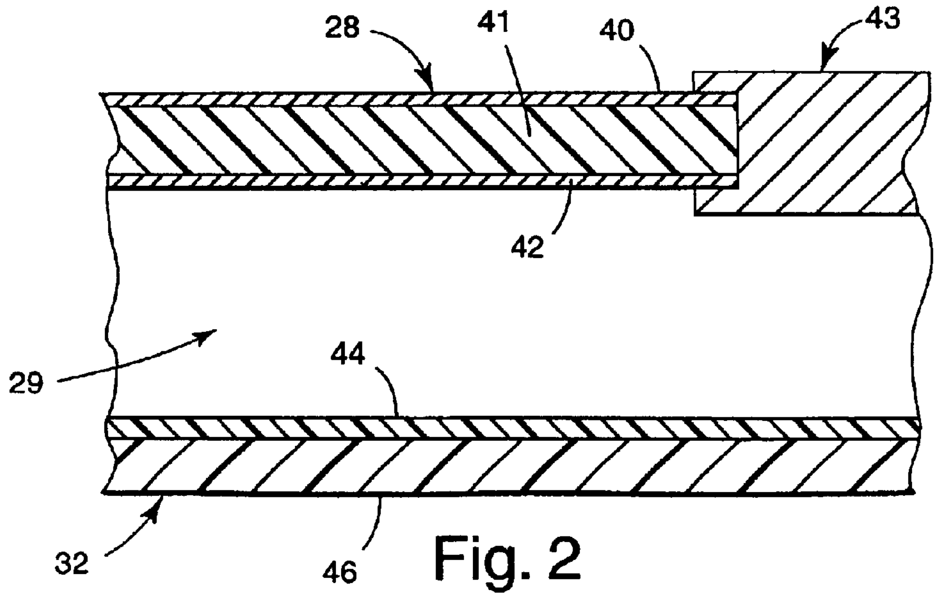
FIG. 2 is an enlarged view of the cross section of a low loss window constructed and arranged in accordance with an embodiment of the invention.

FIG. 2 is an enlarged representation of window 28, gap 29, and material 32. Window 28 includes film 41 with upper protective coating or layer 40 (optional) and lower protective coating or layer 42. Window 28 is supported by a metal grille (typically referred to as a hibachi) (not shown), which rests against support 43. Protective coating 40 faces vacuum chamber 18, while protective coating 42 faces atmosphere 30, which is at about atmospheric pressure. Lower protective layer 42 inhibits free-radical degradation of film 41 initiated by ionization of some components of atmosphere 30, such as oxygen. If film 41 is a polymeric material, protection from free radical oxidation is particularly beneficial in its useful life, which makes its use more practical than shorter-lived windows. Protective layers 40 and 42 can also enhance thermal conduction along film 41, thereby assisting in the dissipation of excess heat from window 28 during irradiation and reducing strain associated with temperature differentials across the width of film 41. In addition, if protective layers 40 and 42 are sufficiently electrically conductive, they can dissipate electrical charge to help resist dielectric rupture of film 41.

Window film 41 may comprise any material that has a unit path length that allows a low loss beam path to be generated. In other words, it has a small enough unit path length that the absorption peak of depth/dose curve for a beam that passes through the window can be shifted to the coating layer of a material being irradiated. Suitable window materials include aluminum, titanium, beryllium, boron nitride, silicon nitride, and silicon. Some windows comprising metallic films may be as thin as 2 $\mu$m or less depending on their strength and flexibility. Some of these materials are used in conventional electron beam windows. However, to be useful in a low loss beam path, they must be of a thickness that provides a relatively short unit path length (in comparison to a conventional window). For example, nominally 12 micrometers titanium windows are used in conventional electron beam generators. The inventors found that the nominally 12 micrometer titanium window they used had an actual thickness of about 13.97 micrometers. For the present invention, a suitable titanium window may have an actual thickness of 12 to 4 micrometers. Various polymeric films, including polyimide films, are particularly suitable as the window foil material because of their small unit path lengths. For example, window foil 41 may comprise a nominally 25 micrometer thick film of polyimide, such as a polyimide polymer that is the result of a polycondensation reaction between pyromellitic dianhydride and 4,4'diaminodiphenyl ether, available as KAPTON HN from E. I. DuPont de Nemours and Co., Wilmington, Del., having an actual thickness of about 27.43 micrometers, that has been aluminum vapor coated, e.g., by sputter coating, on both sides and has a unit path length of about 36 grams per square meter (gsm). Other DuPont Kapton films may also be suitable. Other polymer materials that may be useful as a low loss window include those that are heat stable and durable (i.e., having high tensile strength and the ability to stretch enough to provide stress releief). Suitable polymers may include, for example, aromatic amides, polystyrenes, polysulfones, polyphenylene sulfides, polyether imides, and polyurethanes. A useful polymer window preferably has a unit path length of between about 3 and 54 gsm. The window may have a thickness of between about 10 micrometers and 40 micrometers, preferably between 10 and 30 micromters. The more durable the material, the thinner the window may be. A thinner window is preferable because it will have a shorter unit path length. The window must be strong enough to contain the vacuum environment of vacuum chamber 18.

Preferably, any protective coating applied to the window material will provide electrical charge and thermal dissipation as well as free radical oxidation resistance. Coatings that provide only electrical or thermal dissipation do not extend the useful life of the window to the same degree as a coating that also protects against free radical oxidation. Coatings such as silicon dioxide inhibit oxygen attack on the polymer film of the window, but do not provide electrical charge dissipation. On the other hand, a vapor coated metal such as, for example, aluminum, provide thermal dissipation, electrical charge dissipation, and inhibits free radical oxidation. However, the metal coatings must be sufficiently thick to be gas impermeable, e.g., about 100 nanometers for aluminum. Suitable vapor coating methods are known to those skilled in the art. Suitable protective coating materials, in addition to aluminum, include, for example, nickel, chromium, and gold.

In addition, protective metal coatings may be coated themselves to prevent undesirable oxidation which can render the metallic coatings non-conductive or gas permeable. For example, a silicon dioxide coating will prevent aluminum from oxidizing. Protective coating 40 and/or 42 need only be of a material type, and thickness, sufficient to be substantially impervious to gas diffusion that would cause free radical degradation of the polymer film. By using a low electron-absorbing window, even a relatively low voltage electron beam can pass through window 28 with only a small reduction in power. This enables the generation of an electron beam having a depth/dose curve suitable to irradiate material 32 in an intensity sufficient to provide an adequate dose to modify coating 44 of material 32 without delivering a detrimental dose to degradable substrate 46 of material 32.

A dose profile, or gradient, through the cross section of an irradiated material such as a coated substrate can be determined by plotting the electron beam dose at each increment of distance away from the beam source against the unit path lengths of each material the beam traverses. This is illustrated by FIGS. 4B to 4E.

A dose profile reaches a maximum, or peak, dose at some distance away from the electron beam source, then decreases with increasing path length. A conventional titanium window having a nominal thickness of about 12 micrometers and a unit path length of 54 gsm absorbs enough energy that the peak of a depth/dose curve (i.e., dose profile) does not move beyond the window/gap regions unless the voltage is increased to above 175 kV. This higher voltage typically creates a depth/dose profile profile that is flat and wide and slowly decreases through the irradiated material. Thus, one is forced to balance having a sufficient dose to modify a coating against having an excessive dose that can damage an electron beam degradable substrate. This is because the shape of the dose profile causes both the coating and substrate to be exposed to a dose gradient that declines only gradually. In contrast, the 25-micrometer thick aluminum vapor coated polyimide film window of the present invention has a unit path length of only 36 gsm. This allows the peak absorption to reach beyond the window region because the window absorbs less energy. The lower energy absorption enables the use of low voltages, which can provide steep, narrow depth/dose curves. With these steep curves, suitable surface to interface dose ratios may be as high as 5:1.

By adjusting beam voltages and gap distances, the dose profile can be manipulated to place the absorption peak in the modifiable coating layer. In addition, the shorter unit path length of the low loss windows of the present invention, preferably a polyimide window, allows lower voltages to be used. Preferably, the total unit path length of the window, protective layer(s), and gap is less than about 41 gsm. The low voltages can provide sharply declining dose profiles beyond the dose peak. As a result, the portion of the dose gradient extending into the substrate can be steep causing a small dosage to be received by the substrate, thereby limiting degradation. The energy absorbed by the substrate is preferably less than 40 percent of the energy absorbed by the coating, more preferably less than 25 percent; and most preferably less than 20 percent.

Although the phenomenon of the present invention is described as shifting the peak of a depth/dose curve into a different region, the depth/dose curve for a given voltage does not change. However, for a given depth/dose curve, shortening the unit path length of a region traversed by the electron beam will cause subsequent regions, defined by their unit path length, to be shifted closer to the electron beam source and, therefore, closer to the absorption peak. This is illustrated, e.g., by comparing FIGS. 4B, 4C, and 4D. As these Figures show, by reducing the unit path length of the window and gap, the adhesive layer, in terms of unit path length, moves closer to the electron beam source.

Monte Carlo code may be effectively used to simulate depth/dose profiles useful for predicting the effects of various operating conditions on materials being irradiated. These predictions allow for anticipating and adjusting the electron beam dose at various depths in the irradiated material, and allow for the optimal dosage needed to modify a coating on a substrate without excess dosage that can degrade the substrate. Suitable Monte Carlo codes include Integrated Tiger Series (ITS), Electron Gamma Shower (EGS), and Monte Carlo Neutron-Proton (MCNP). Monte Carlo code makes it possible to identify an advantageous relationship between dosage and depth. The use of Monte Carlo code and related calculations are described in Douglas E. Weiss, Harvey W. Kalweit, and Ronald P. Kensek, *Low-Voltage Electron-Beam Simulation Using the Integrated Tiger Series Monte Carlo Code and Calibration Through Radiochromic Dosimetry*, which is Chapter 8 of *Irradiation of Polymers*, ACS Symposium Series 620, American Chemical Society, Washington D.C. 1996. An alternative method that can be used to calculate depth/dose profiles is disclosed in U.S. Pat. No. 5,266,400, incorporated by reference.

Figure 3:
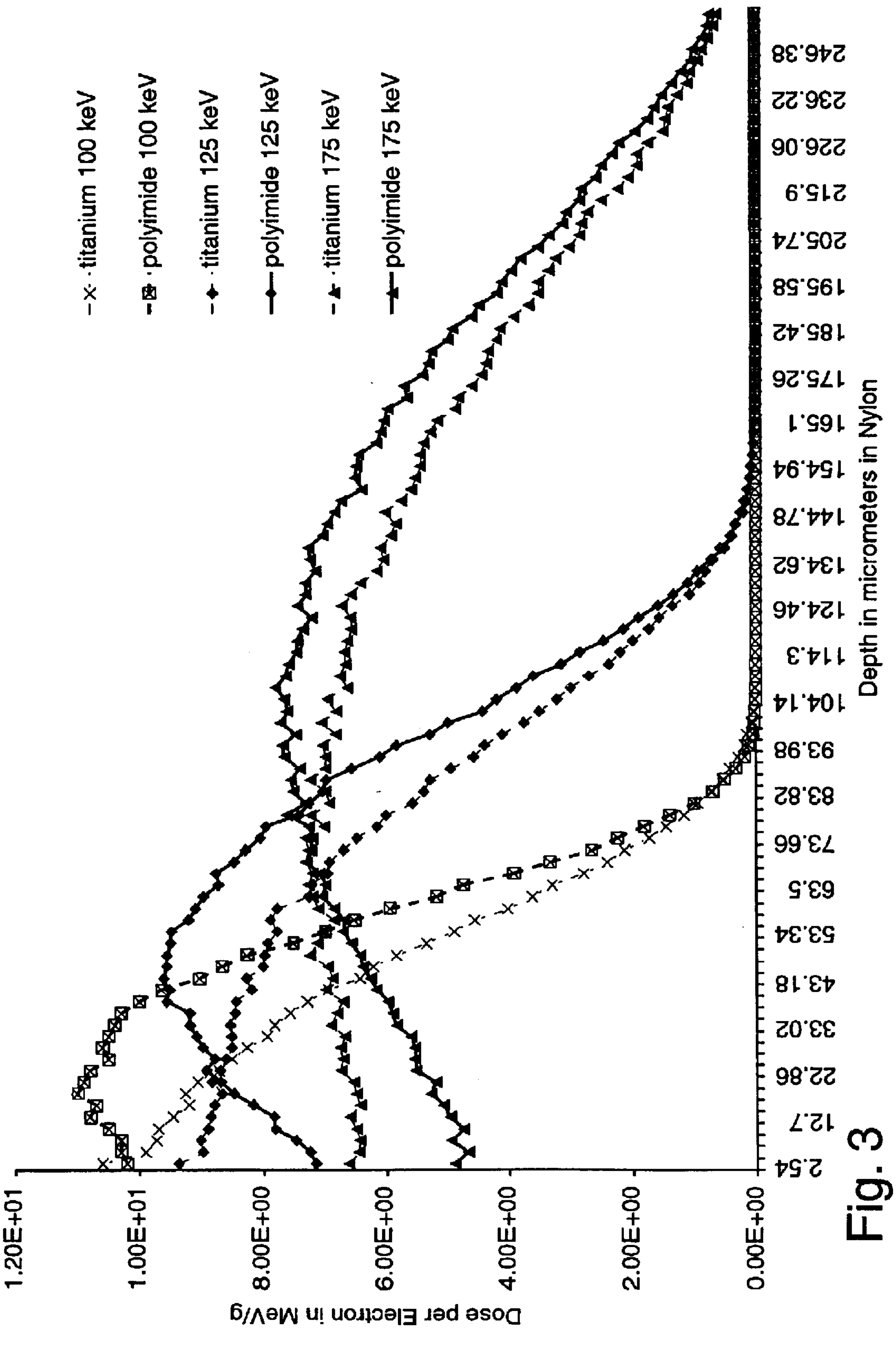
FIG. 3 is a graph showing simulated radiation depth/dose gradients through Nylon for an 8 micrometer titanium window and a 25 micrometer polyimide window having a 100 nanometer protective coating (both having unit path lengths of 36 grams per square meter) and at electron beam voltages of 100, 125, and 175 kilovolts.

The atomic number of the window material can affect the shape of a depth/dose curve even when beam voltage is constant. For two materials having the same unit path length, the material having a higher atomic number will cause more electrons to scatter. This moves the dose peak closer to the electron beam source, and because the electrons still terminate at the same depth for a given unit path length, this decreases the negative slope of the post-peak gradient. FIG. 3 illustrates simulated depth/dose curves through Nylon at three different beam voltages (100, 125 and 175 keV) and a constant gap of 4 micrometers for both a nominally 8 micrometer thick titanium window and a nominally 25 micrometer thick polyimide window having a protective aluminum coating. Both windows have a unit path length of 36 gsm. As can be seen, the nominally 8 micrometer thick titanium window having an atomic number of 12 produces a depth/dose curves having a lower peak dose followed by a more gradual gradient decline as compared to depth/dose curves produced by the nominally 25 micrometer thick polyimide window. Thus, even when the same interface dose is achieved with a titanium window and a polyimide window having equal path lengths, it may be advantageous to use a polyimide window to reduce energy penetration into a substrate layer.

The low loss windows of the present invention may also be used advantageously with conventional electron beam generators. Typically it is most advantageous with conventional electron beam generators at voltages from about 175 kV up to about 300 kV, especially when curing thick materials. The windows of the present invention can provide a broad distance (i.e., depth) over which identical surface/interface doses can be achieved. For example, FIG. 3 illustrates that at 175 kV, a 25 micrometer polyimide window can provide a dose of about 5.0 Megaelectronvolts-square centimeter/gram (MeV-$cm^2$/g—source electron) at distances of 2.54 and 190.5 micrometers (0.1 and 7.5 mils) from the electron beam source, whereas the nominally 8 micrometer titanium window only provides a uniform dose at 2.54 and 127 micrometers (at a dose of about 7 MeV-$cm^2$/g). Applications at a high voltage range might include improving penetration of small bore tubing or extending the depth of cure into a thick web of material.

In the present invention, the electron beam radiation used to irradiate the material has an energy from about 30 to 150 keV in certain embodiments, and from about 50 to 75 keV in other embodiments, depending on the equipment being used. The electron beam radiation energy is preferably less than 120 keV, more preferably less than 100 keV, and most preferably less than 90 keV.

Figure 4A:
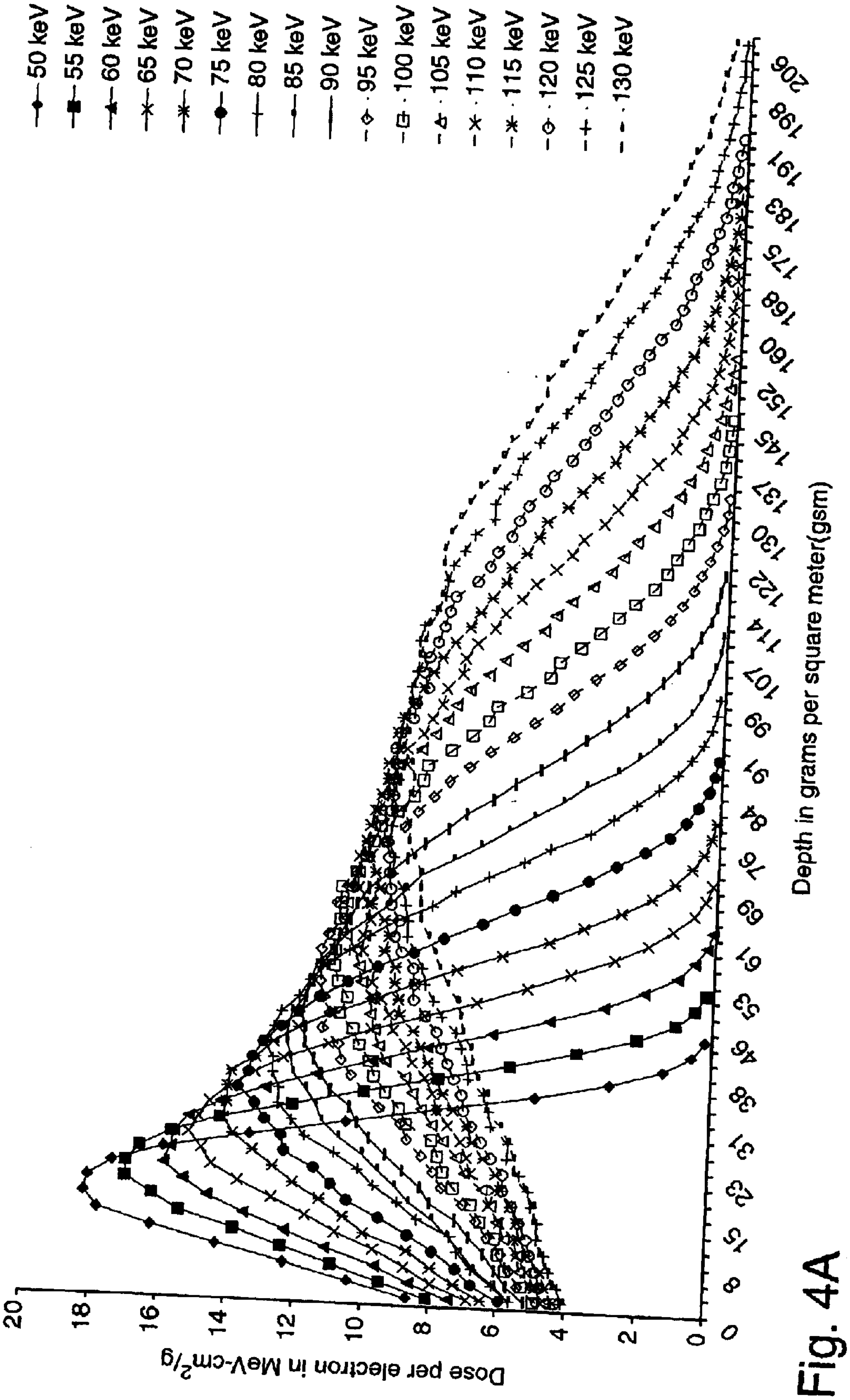
FIGS. 4A–4E are graphs showing simulated radiation dose vs. unit path length, at different voltages, through (A) water, (B) a conventional nominally 12 $\mu$m titanium window, conventional nitrogen gap, and adhesive tape, (C) a conventional nominally 12 $\mu$m titanium window, small nitrogen gap, and adhesive tape, (D) a nominally 3 $\mu$m boron nitride window, small gap and adhesive tape, and (E) a nominally 25 $\mu$m polyimide window with protective coating, small gap, and adhesive tape.

FIG. 4A shows a series of Monte Carlo code depth/dose deposition curves, over a selected range of voltages, that simulate the dose deposited at various depths through water. Water is used here to represent a standard unit-density material of low atomic number suitable for predicting energy loss through materials, such as polymers, having similar densities and components with similar atomic numbers. The simulations assumed no window or gap to absorb electrons.

The low-loss window of the present invention can cause the depth/dose curve to shift and change shape. As indicated in FIG. 4A, lower voltage electron beams have a higher peak dose, and narrower distribution, than higher voltage electron beams. Although the total energy received by the water is less at low voltages (as measured by the area under each curve), the energy is received at a shallower depth. This allows the dose to be substantially restricted to a narrow band near the water surface. As seen in FIG. 4A, the depth/dose curve for a 50 keV electron beam is substantially between a depth of 0 and approximately 35 grams per square meter of the irradiated material. In contrast, for a 130 keV electron beam, which is at the higher end of the energy range for the present invention, the depth/dose curve gradually increases from the water surface until it peaks at around a depth of 95 grams per square meter, after which it gradually diminishes, trailing off at around 210 gsm.

A low loss beam path is significant because it allows a larger amount of low voltage electrons to pass through the window, thereby permitting the dose peak to move into the adhesive layer. Using the apparatus of the present invention, it is possible to adjust the position of the depth/dose curve, in relation to the depth of the coating and substrate layers, by varying the electron absorption of the gap and/or window so that the coated substrate receives an optimal dose of electrons at an appropriate depth to avoid substrate degradation. For example, as shown in FIG. 4A, a 65 keV beam could deliver a sufficient dose to modify the entire coating thickness of a relatively thin coating (60 gsm). The dose would be delivered substantially between a depth of approximately 0 and 60 grams per square meter. Only a small amount of a substrate, at depths greater than 60 gsm would receive electron beam radiation. However, it should be noted that this example does not take into account window and gap absorption (it assumed a vacuum, which would absorb no energy). In actual use, higher voltages would be necessary to compensate for window and gap absorption while still achieving the same surface doses as shown in 4A.

Figure 4B:
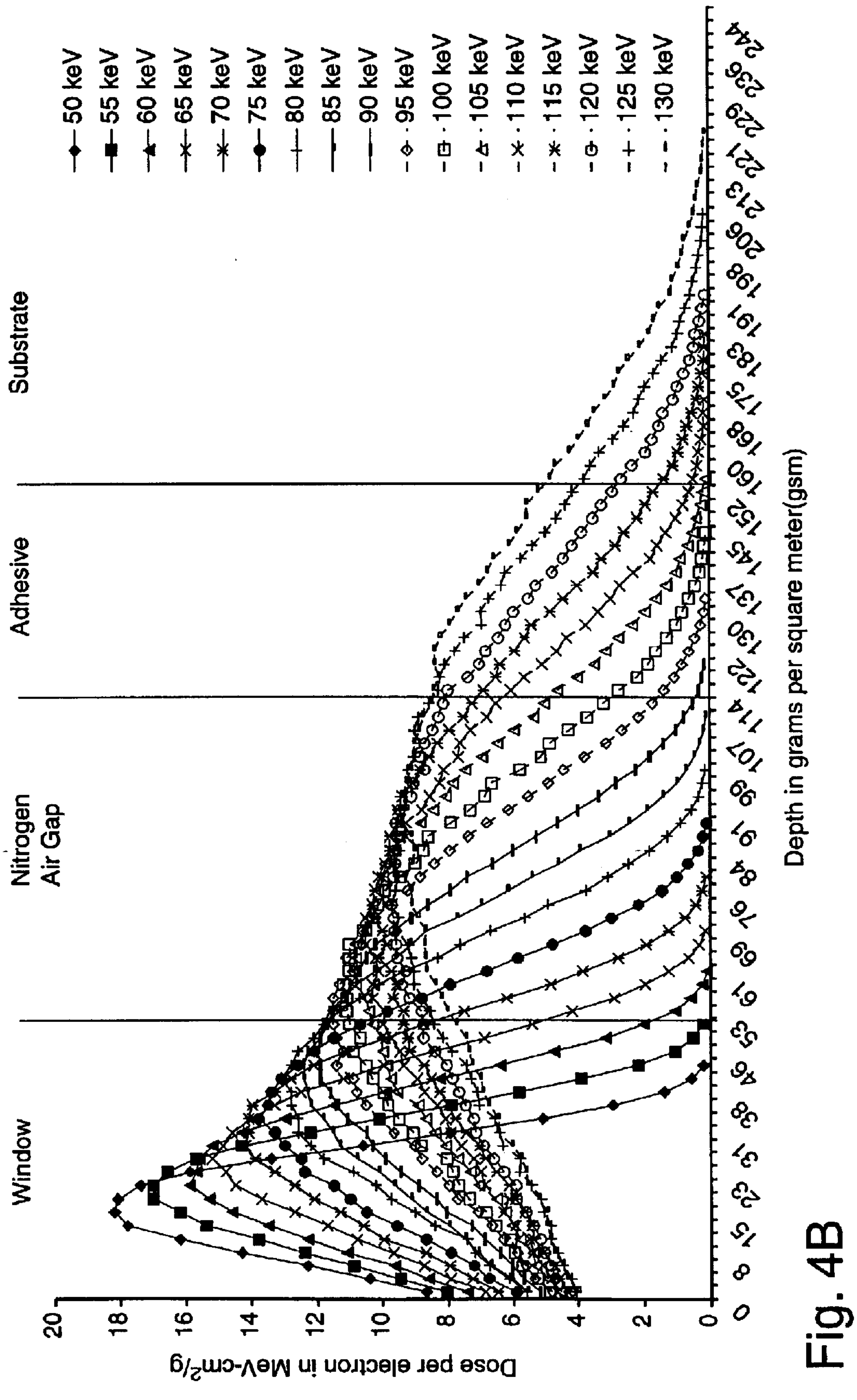

FIGS. 4B through 4E illustrate depth/dose curves through the cross-section of a typical pressure-sensitive adhesive tape construction irradiated using different window and gap combinations. FIG. 4B illustrates the shape of a depth/dose curve through a conventional nominal 12 micrometer thick titanium window (actual thickness of about 14, with a unit path length of about 57 gsm), a common 50-millimeter nitrogen gap (unit path length of about 62 gsm), a 43-micrometer thick electron beam crosslinkable pressure-sensitive adhesive (unit path length of about 40 gsm), and a 127 micrometer thick electron beam degradable non-woven substrate (unit path length of about 80 gsm).

Figure 4C:
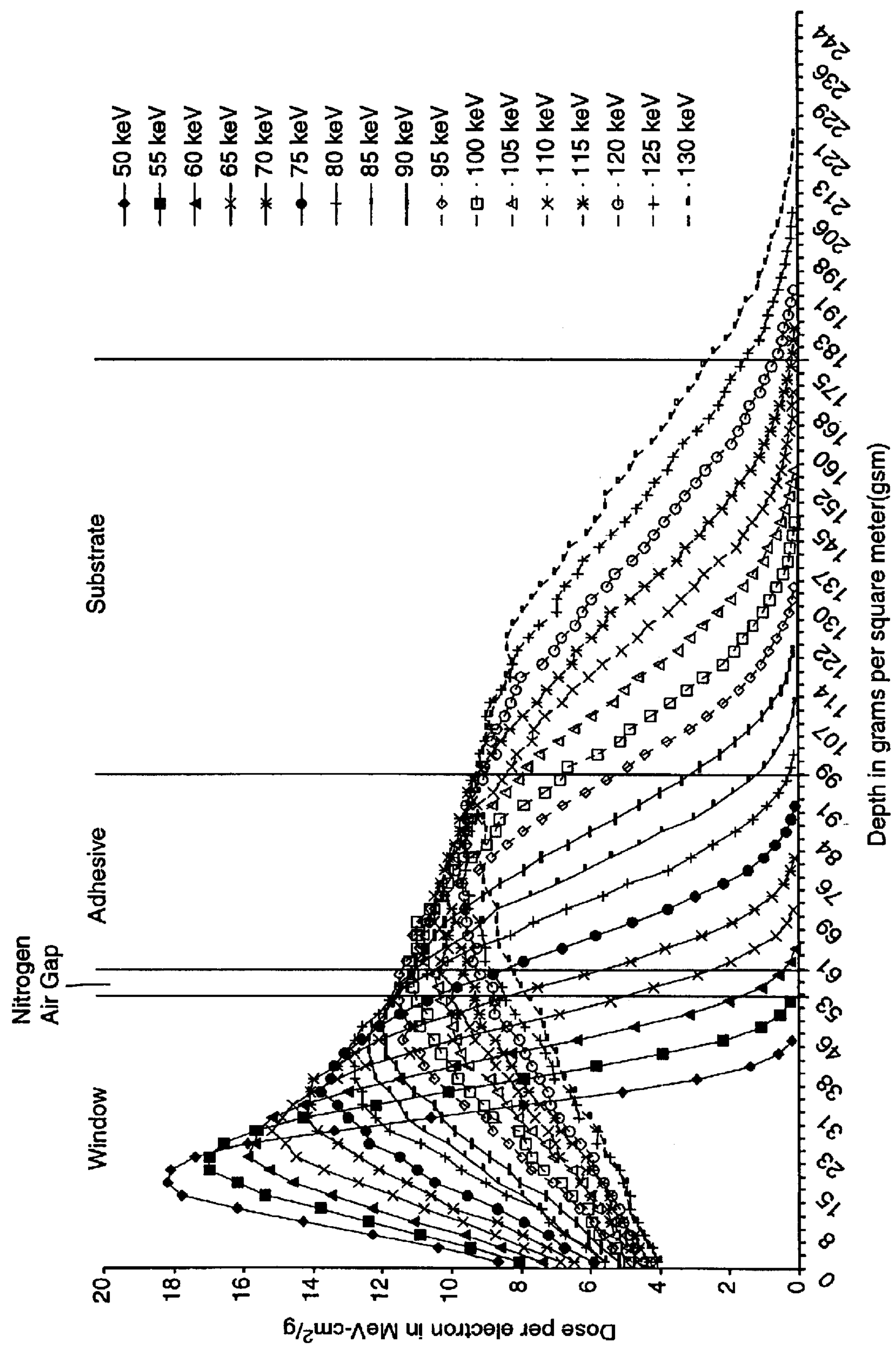

FIG. 4C illustrates the shape of a depth/dose curve through a conventional nominally 12 micrometer thick titanium window, a narrow 4 millimeter thick nitrogen gap (unit path length of about 5 gsm), a 43 micrometer thick electron beam crosslinkable pressure-sensitive adhesive, and a 127 micrometer thick electron beam degradable non-woven substrate.

Figure 4D:
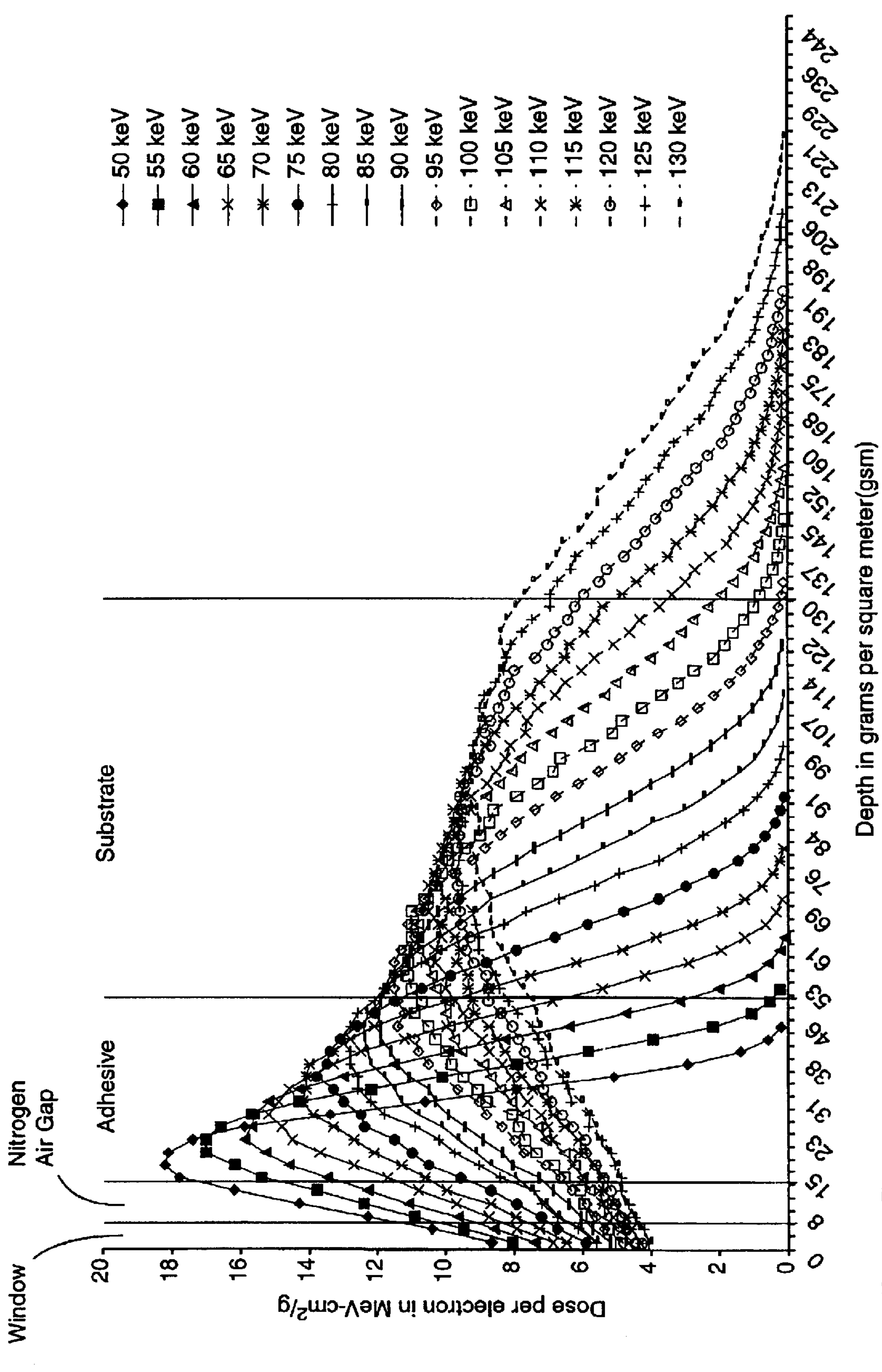

FIG. 4D illustrates the shape of a depth/dose curve through a nominally 3 micrometer thick boron nitride window (unit path length of about 6.8 gsm), a narrow 4 millimeter thick gap, a 43 micrometer thick electron beam crosslinkable pressure-sensitive adhesive, and a 127 micrometer thick electron beam degradable non-woven substrate.

Figure 4E:
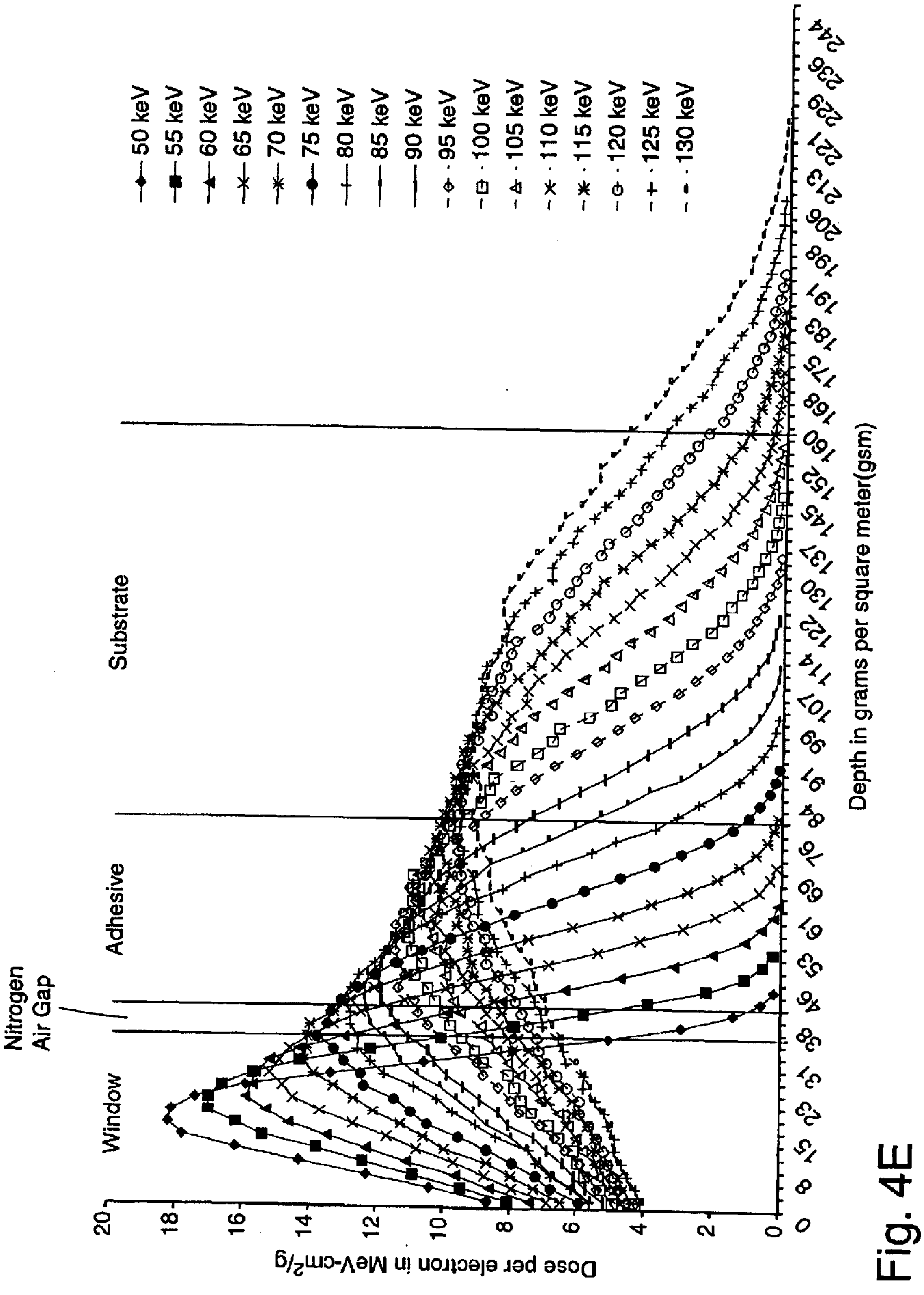

FIG. 4E illustrates the shape of a depth/dose curve through an aluminum vapor coated nominally 25 micrometer thick polyimide film window (actual thickness of about 27, with a unit path length of about 36 gsm), a narrow 4 millimeter thick gap, a 43 micrometer thick electron beam crosslinkable pressure-sensitive adhesive, and a 127 micrometer electron beam degradable non-woven substrate.

As shown by the above graphs, the dose profile produced with the low voltage beams used in the present invention is narrower and steeper than with higher voltage beams. This profile permits the substrate dose to be significantly less than the coating dose. Also, as can be seen by comparing FIGS.

4B to 4E both the unit path length of the window and the thickness of the gap significantly influence the position of the depth/dose curve through the irradiated coating and substrate.

A depth/dose profile through a particular irradiated material could be shaped by exposing the material to a number of beams, each having different voltages. The dosage received by the irradiated material at a particular depth would be the sum of the doses provided by each beam. A combination of electron beams could be used to optimize irradiation patterns for the material being irradiated. For example, a low voltage beam, with a very narrow distribution, could be used to supplement or increase the dose provided to the surface and/or interior of a coating layer without providing any additional dose to the coating substrate interface. For thick irradiated layers, more than two exposures to various low voltage beams could produce more complex profiles. Such multiple exposures could be accomplished by arranging several compact e-beams in series on an operating line, or by making multiple passes with an irradiated material through a single electron beam source.

In addition to preventing degradation in the substrate material, the present invention can be useful for ensuring that the coating/substrate interface receives an adequate electron beam dose to bind the two layers together when necessary. This can be important when a strong bond is needed between a coating and an electron beam degradable substrate. For example, when an adhesive is applied to a backing, it is often important that the adhesive not separate from the backing. The present invention can allow the portion of the adhesive at the interface to receive sufficient electron beam radiation to ensure a strong bond between the adhesive and backing layer without exposing the backing to an excessive electron beam dose.

Figure 5:
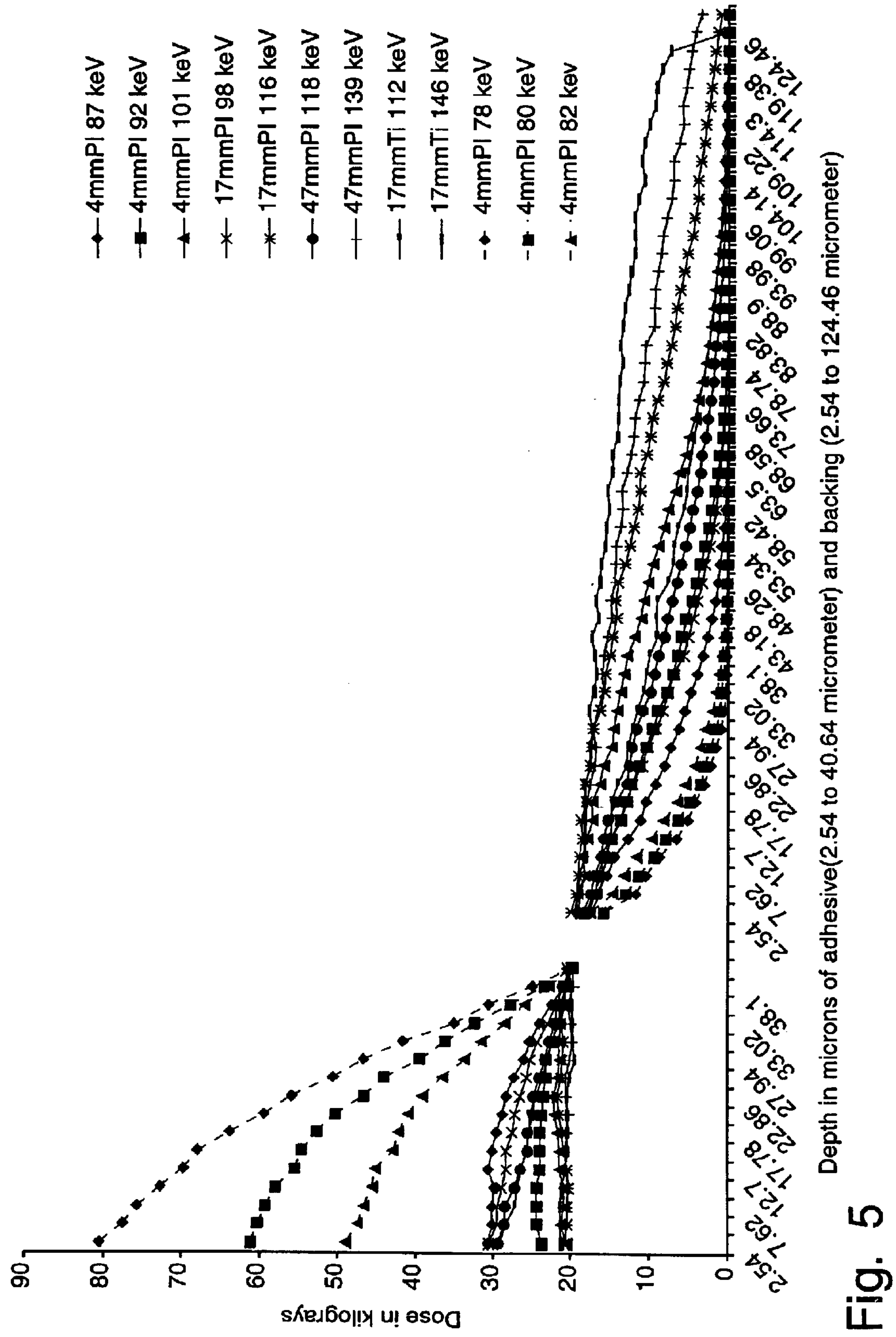
FIG. 5 is a graph showing simulated dose vs. depth of electron beam radiation through the adhesive tape of FIGS. 4B–4E using different gap distances, window materials, and voltages. All electron beam calculations were normalized, by adjusting current, to have a targeted interface dose of 20 kilogray (kGy) to enable comparison of surface to interface dose ratios.

FIG. 5 illustrates various depth/dose gradients generated at different operating conditions, as discussed in the Examples, with the same adhesive and backing material as in FIGS. 4B through 4E. The key refers to the gap (e.g., 4 mm), the window material (PI refers to a nominally 25 μm polyimide window and Ti refers to a nominally 12 μm titanium window), and electron voltage. The profiles (with depth indicated in micrometers for each layer) of the adhesive and backing layers are given independently to show the surface to interface dose relationships more clearly for various window/gap (and voltage) combinations. The space between the layers represents the adhesive/backing interface. The currents of the beams were adjusted to provide an interface dose of 20 kGy for ease of comparison. As the unit path length (as determined by multiplying the density of the material times its thickness) of the window/gap combination was increased, voltages were appropriately increased to maintain acceptable dose gradients through the adhesive layer. The appropriate voltage could be calculated from FIG. 4A, using the method illustrated in FIGS. 4B to 4E. The increased voltage caused an increase in total dose received by the backing, which increased its degradation. This degradation can be correlated to total energy deposited in the backing, which is represented by the area under the backing depth/dose curve. The inventors found that a low loss path using a nominally 25 micrometer polyimide window, a 4 mm gap, and a voltage of 78 kV resulted in no measurable substrate degradation as determined by the MIT Flex Test (shown in Tables 6 and 7). (Because the curve in FIG. 5 showing the total energy deposited with this combination of window, gap, and voltage approaches zero at about 30 micrometers into the depth of the backing, all comparisons were made by calculating the energy absorbed from the interface to 30 micrometers into the backing.) As seen in Table 7, combination of a nominally 25 micrometer window (with an actual thickness of about 27 μm), a 4 mm gap, and 78 kV voltage, produced total energy absorption of about 11.2 mJ/cm$^2$. The backing showed no degradation, as evidenced by an MIT Flex Number of 1212. When the same window/gap combination was used with increased voltages, energy absorption increased to 25 to 35 mJ/cm$^2$ and degradation increased as evidenced by MIT Flex Numbers in the range of 800. Combinations of window material, gap, and voltage that resulted in less than 10 mJ of energy being absorbed by the backing should produce tapes with good MIT Flex Test results.

This invention is not limited to the materials investigated. For example, the present invention may be used to modify non-adhesive electron beam modifiable coating materials on electron beam degradable backings. Ethylenically unsaturated materials such as acrylates and vinyls, which may be used to make hard coats and top coats are examples of such materials. As illustrated in FIGS. 4A to 4E, any combination of window materials and gap distances, when expressed in gsm, and when coupled with the information provided by the curve shown in FIG. 4A will allow the calculation of target voltages to achieve the same dose gradients as in 4A.

Figure 6:
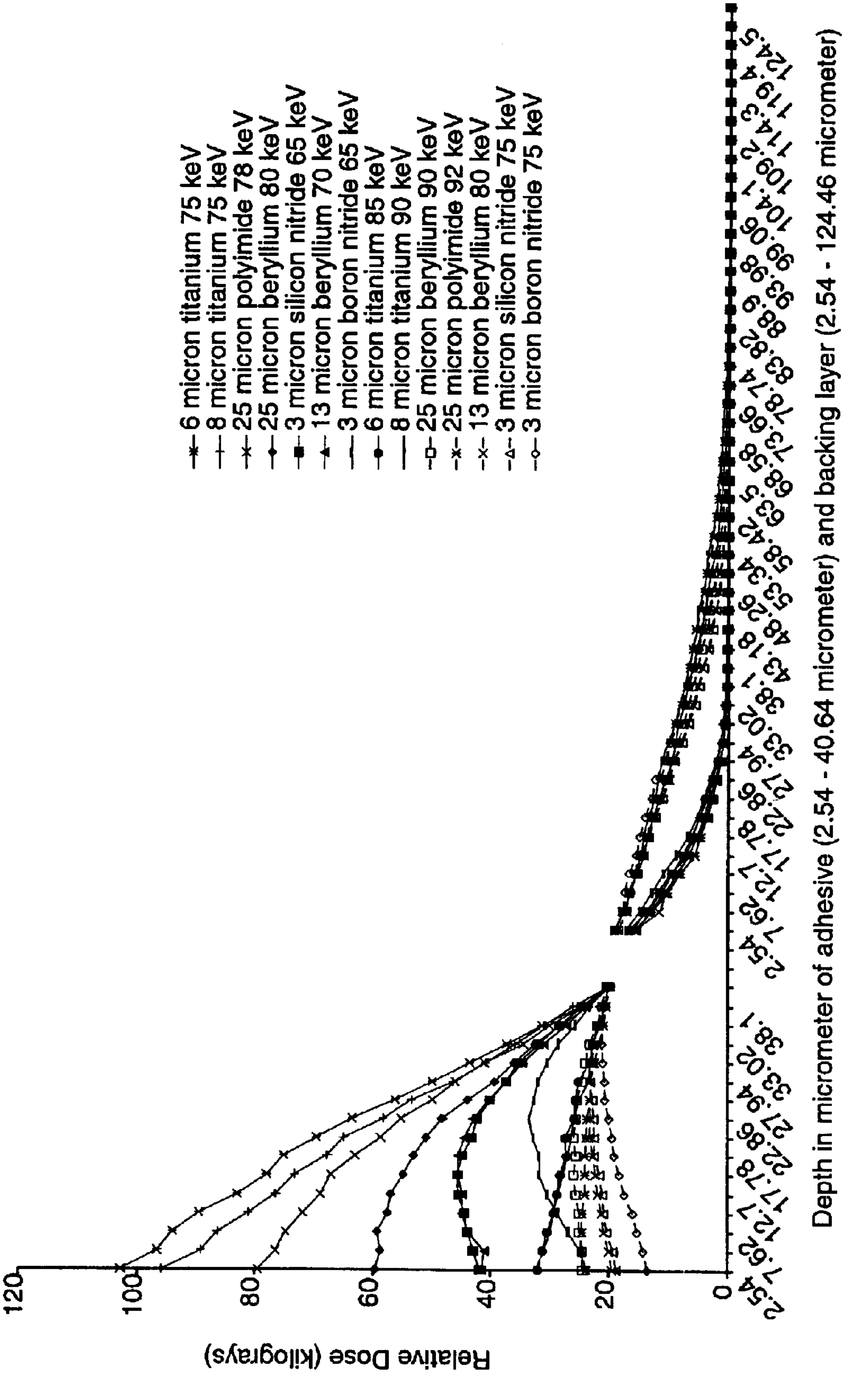
FIG. 6 is a graph comparing simulated dose/depth curves through the adhesive tapes of FIGS. 4B–4E for various voltage and window material combinations and a constant 4 millimeter gap. All electron beam calculations were normalized, by adjusting current, to have a targeted interface dose of 20 kGy to enable comparison of surface to interface dose ratios.

FIG. 6 shows the depth/dose curve through a tape construction, based on Monte Carlo simulations, assuming a range of window materials and thickness, and a fixed gap of 4 μm. Depth/dose curves were generated for windows comprising titanium, beryllium, silicon nitride, and boron nitride, using the technique illustrated in FIGS. 4B to 4E. These curves were matched against depth/dose curves from FIG. 5 for the nominally 25 micrometer thick polyimide window at voltages of 78 and 92 kV. Calculations were made to provide about the same interface dose for each curve (20 kGy). FIGS. 5 and 6 allow comparison of different surface to interface dose ratios. It shows that the ratios can be advantageously controlled by window material, gap, and voltage selection. Note that FIG. 6 shows that the depth/dose gradient through the adhesive layer is eventually reduced as the unit path length for the window is reduced and the dose peak is allowed to move into the adhesive layer. For example, the depth/dose gradient for a 65 keV beam through a 3 micrometer thick boron nitride window has nearly equal entrance and exit doses in the adhesive layer with the same minimal penetration into the paper as observed for a 78 keV beam through a 25 micrometer polyimide window, which has an entrance dose five times greater than exit dose. The similar entrance/exit doses may allow for a customized balance of modification (such as crosslinking) through the depth of an adhesive layer without increasing damage to the substrate. This, in turn, could allow for a customized balance of adhesive properties, e.g., peel and shear, to provide a tape with properties customized to its intended use.

For some embodiments of the invention, such as the adhesive tape construction used in the Examples, the intensity of electron beam radiation received by the coating surface may be between about 1 and 5 times greater than the intensity of electron beam radiation received by the substrate surface. For other embodiments, a ratio as high as 5:1 will adversely modify the surface of the coating layer, e.g., over-crosslink or degrade the coating layer. An ideal depth/dose curve for a tape construction can be determined by selecting a combination of window material and gap distance that provides the dose profile through the layers needed to obtain optimum tape properties. Typical measured properties for paper-backed pressure-sensitive adhesive tapes, such as those in the examples, are 5-bond (cohesive strength of adhesive), holding power (slow rate peel resistance), and MIT flex (folding endurance test, the results of which are sensitive to degradation of the backing).

Combinations of electron beam modifiable coatings and electron beam degradable backings other than those specifically disclosed herein will have different optimum voltages, gaps, and interface doses for achieving desired modifications. However, the optimum values can be determined by one skilled in the art based on the teachings herein, for example by knowing the thicknesses and densities of the materials used and applying this information to FIG. 4A.

The low loss path of the present invention can provide increased material throughput during production. The low loss path causes less interaction between the electrons and the window and gap materials than in a conventional electron beam path, thereby making available a greater dose to the surface of the coating.

While specific examples have been used to illustrate the invention, the invention is not limited to the particular embodiments described, but rather covers modifications, equivalents, and alternatives falling within the spirit and scope of the appended claims.

Experimental Section

The following experiments were conducted to demonstrate effective parameters for operation of the apparatus of the invention. Tables 1 through 5 provide a summary of the results of irradiation of dosimeters at five different target coating/substrate interface dosages: 20, 40, 60, 80 and 100 kGy. The window material, voltage, gap, and current were all varied to assess the impact of altering these variables. In addition, tests on the physical properties of materials irradiated in accordance with the invention are provided in Tables 6, 7 and 8. Comparative data, obtained using a conventional nominally 12 micrometer titanium window, are also included in the tables.

For these experiments, the radiation processing was performed on an Energy Sciences, Inc. Model CB-175 electron beam generating apparatus equipped with a six-inch wide support (web) running through an inert chamber. Samples of coated substrates were conveyed on the web at a speed of 3.1 meters per minute. The oxygen level within the chamber of the CB-175 was restricted to a range of 50 to 100 ppm. The standard nitrogen gap between the window and web path (using original equipment) of the CB-175 is 18 mm. To reduce this nitrogen gap distance, spacers were added between the vacuum chamber and the window support. For example, to create a 4-mm thick nitrogen gap, a 14-mm thick spacer was placed between the vacuum chamber and the window support. Upon installation of the spacer, a 3-mm thick low profile window clamp was used to maintain the window in place on the electron beam generating apparatus. This low profile clamp was a substitute for an original 10-mm thick standard clamp. This substitution was made to provide adequate clearance past the clamp for the irradiated substrate.

To calibrate the CB-175, extensive dosimetry was done using both 45 micron and 10 micron dosimeters, which are polymeric films containing radiochromic dye, available from Far West Technologies, Inc., Goleta, Calif. Dosimetry was performed at 10 kV increments, from 90 to 180 kV, for both polyimide and titanium windows. The titanium window material (having a nominal thickness of 12 $\mu$m) was found to be 13.97 $\mu$m thick, and the polyimide film, (previously available as Kapton E, believed to be the equivalent of currently available KAPTON HN (a polyimide polymer that is the result of a polycondensation reaction between pyromellitic dianhydride and 4,4'diaminodiphenyl ether), available from DuPont and sold at a nominal thickness of 25.4 $\mu$m (1 mil)) was found to be 27.43 microns thick, including a 100-nanometer thick aluminum coating on each side. In all cases, three each of the 10 and 45 micrometer dosimeters were mounted onto index cards, which were attached to the moving web, and irradiated. The dose at each voltage for each dosimeter thickness was determined by averaging the three readings obtained. The dosimetry data was used to compare the actual instrument dose to the indicated instrument current in order to determine and adjust the actual power of the CB-175.

The individual depth/dose relationship at each voltage was determined from an average of three dosimeter stacks. Stacks of the 10 $\mu$m dosimeters were typically used for low voltages and the 43.5 $\mu$m dosimeters were typically used for high voltages, e.g., above about 125 kV. The actual voltage was determined by comparing the stepped depth/dose profiles of the dosimeter stacks to Monte Carlo simulations of these stacks over a range of voltages. The CB-175 actual electron beam voltage was consistently 90% of the indicated voltage, and this information was used to provide corrected voltages. All voltages referred to in this document are the corrected voltages.

Masking tape samples were used to generate the testing data shown in Tables 6 to 9. The tape comprised an adhesive coating on a fabric backing. The adhesive comprised one or more electron beam crosslinkable elastomers and one or more tackifying resins with no additional curing additives and had a layer thickness of 40.6 micrometers and a specific gravity of 0.93. The tape backing was a cellulose-based non-woven fabric approximately 107 micrometers thick with a specific gravity of 0.63. The tape was made by extruding the adhesive layer onto the backing.

Measured doses were compared to calculated doses obtained by Monte Carlo code for identical cross-sections to validate the code predictions. All calculations were made using actual material thicknesses (e.g., the nominally 12 $\mu$m titanium window was actually about 13.97 $\mu$m thick, so 14 $\mu$m was used for the calculations; and the nominally 25 $\mu$m thick Kapton window was actually about 27.43 $\mu$m thick, so 27 $\mu$m was used for calculations). The inventors found it was important to use actual measurements rather than nominal thicknesses and actual voltages rather than indicated voltages to obtain simulations that reconciled with measured values; this appears to be especially important when operating at low voltages. Monte Carlo code was also used to calculate currents needed at selected voltages to provide doses of 20, 40, 60, 80 and 100 kGy at the interface of the adhesive and the backing. The results are shown in Tables 1 through 5. The 10 $\mu$m dosimeter approximated the adhesive surface. The 43.5 $\mu$m dosimeter approximated the total bulk of the adhesive and was used to approximate the adhesive/backing interface. In most cases, the results of the measured and calculated doses were within 20 percent of one another, and only in a few cases was the variance greater than 20 percent, for reasons that are not known. It is believed this high error margin is partially due to instabilities caused by operating the machinery below the voltage range it was designed for (approximately 150 to 175 kilovolts) and at a low current (less than 1 milliamp (mA)).

Table 1 shows the calibrations needed to obtain a targeted interface dose of 20 kGy. Examples 1 through 10 show 20 kGy targeted doses at gap distances of 4, 17, and 47 mm for a nominally 25 $\mu$m polyimide window having a protective 100 nanometer aluminum coating. Comparative Examples 11 and 12 show 20 kGy targeted doses at a gap distance of 17 mm for a nominally 12 μm titanium window. The voltage was varied for the examples from a low of 78 kV to a high of 139 kV for the polyimide windows; and from 114 to 146 kV for the titanium window. The current was also varied from a maximum of 0.63 mA to a minimum of 0.22 mA (the range varied for each window/gap combination).

As the voltage was increased, the depth/dose gradient decreased. To compensate, the current was decreased to obtain the same target interface dosage at each voltage for each window material. Example 1 of Table 1 used a 78 kV voltage and a 0.63 mA current to obtain a targeted 20 kGy dose at the adhesive/backing interface. The calculated dose at a depth of 10 micrometers was 76 kGy and the measured dose was 59 kGy; the calculated dose at 43.5 micrometers was 43 kGy and the measured dose was 29 kGy. In contrast, example 4 of Table 1 used an 87 kV voltage and a 0.27 mA current to obtain a targeted 20 kGy dose at the interface. The calculated dose at a depth of 10 micrometers was 32 kGy and the measured dose was 26 kGy; the calculated dose at 43.5 micrometers was 24 kGy and the measured dose was 14 kGy. Comparing examples 1 and 4 of Table 1 demonstrates that increasing the voltage and lowering the current produces a lower measured dose at both 10 and 43.5 micrometers. Similar correlation trends are identified in the other Table 1 examples.

Table 1 also indicates that it is possible to achieve a greater difference between the dose near the surface of the irradiated material (10 μm) and the interior, e.g., the coating/substrate interface, of the material (43.5 μm) when a nominally 25 μm polymeric (polyimide, in this case) window is used rather than a conventional nominally 12 μm titanium window. This greater difference indicates that peak absorbance is shifting into the irradiated material. Specifically, in reference to Table 1, examples 7 and 11 both use a gap of 17 mm, but example 7 uses a nominally 25 μm polyimide window while example 11 uses a nominally 12 μm titanium window. The polyimide window has a shorter unit path length. In example 7 the measured dose at the 10 micrometer depth was approximately 1.7 times greater than at the 43.5 micrometer depth. In contrast, in example 11 the measured dose in the 10 micrometer dosimeter was only slightly more than 1.2 times greater than the 43.5 micrometer dosimeter. Thus, the use of a low loss polyimide window can improve performance by increasing the dose in the adhesive portion of the irradiated material relative to the backing portion of the material, thereby avoiding degradation to the backing material.

In summary, Table 1 shows the relationship of surface dose (10 μm) to total dose through the adhesive layer (43.5 μm) at a targeted interface dose of 20 kGy. The surface dose increases as the peak of the depth/dose curve moves away from the window and into the coating layer to be irradiated. This occurs as the unit path length of the window and gap regions are decreased, and lower voltages are used to achieve or approach a targeted interface dose. Lower voltages correlate to a sharp decline in dose gradient through the backing material.

In addition, because the adhesive layer can receive a higher dose at a lower voltage with the present invention, the coated substrate may be processed faster than with a conventional system that uses nominally 12 micrometer metallic windows, a 50 mm wide gap, and the same current settings. The difference can be observed, for example by comparing Example 3 to Comparative Example 11, both of Table 1. Example 3 uses a nominally 25 μm polyimide window, a 4 mm gap, 82 kV voltage, and a 0.40 mA current, and provides a measured dose of 29 kGy at 10 μm. Comparative Example 11 uses a nominally 12 μm titanium window, a 17 mm gap, 114 kV voltage, and a 0.41 mA current, and provides a measured dose of 17 kGy at 10 μm. Because the present invention allows for a higher surface dose at a given current, it allows for a higher throughput of material being irradiated, even when the electron beam generator is operating at maximum current.

TABLE 1

Targeted Interface Dose: 20 kGy

| Example | Gap Distance (mm) | Window Material | Voltage (kV) | Current (mA) | Depth (μm) | Calculated Dose (kGy) | Measured Dose (kGy) |
|---|---|---|---|---|---|---|---|
| 1 | 4 | Polyimide | 78 | 0.63 | 10 | 76 | 59 |
| | 4 | Polyimide | | | 43.5 | 43 | 29 |
| 2 | 4 | Polyimide | 80 | 0.51 | 10 | 62 | 51 |
| | 4 | Polyimide | | | 43.5 | 38 | 39 |
| 3 | 4 | Polyimide | 82 | 0.40 | 10 | 47 | 29 |
| | 4 | Polyimide | | | 43.5 | 31 | 23 |
| 4 | 4 | Polyimide | 87 | 0.27 | 10 | 32 | 26 |
| | 4 | Polyimide | | | 43.5 | 24 | 14 |
| 5 | 4 | Polyimide | 92 | 0.22 | 10 | 25 | 21 |
| | 4 | Polyimide | | | 43.5 | 21 | 15 |
| 6 | 4 | Polyimide | 101 | 0.21 | 10 | 21 | 23 |
| | 4 | Polyimide | | | 43.5 | 19 | 12 |
| 7 | 17 | Polyimide | 98 | 0.29 | 10 | 30 | 19 |
| | 17 | Polyimide | | | 43.5 | 24 | 11 |
| 8 | 17 | Polyimide | 116 | 0.23 | 10 | 17 | 21 |
| | 17 | Polyimide | | | 43.5 | 19 | 21 |
| 9 | 47 | Polyimide | 118 | 0.33 | 10 | 29 | 24 |
| | 47 | Polyimide | | | 43.5 | 23 | 24 |
| 10 | 47 | Polyimide | 139 | 0.25 | 10 | 21 | 17 |
| | 47 | Polyimide | | | 43.5 | 20 | 20 |
| CE 11 | 17 | Ti | 114 | 0.41 | 10 | 29 | 17 |
| | 17 | Ti | | | 43.5 | 22 | 14 |
| CE 12 | 17 | Ti | 146 | 0.29 | 10 | 22 | 18 |
| | 17 | Ti | | | 43.5 | 21 | 17 |

Table 2, below, shows the affect on 10 micrometer dosimeters and 43.5 micrometer dosimeters of changes in gap distance, window material, voltage, and current used to obtain a target interface dose of 40 kGy. As in Table 1, the greatest difference between the dose near the surface (10 micrometer) and the dose through the entire irradiated adhesive material (43.5 micrometer) are accomplished with a low loss window. In particular, the greatest dosage difference is achieved when the low loss nominally 25 μm polyimide window having a 100 nm thick aluminum protective coating is combined with a small gap distance. Example 1 of Table 2 shows that the polyimide window, in conjunction with a 4 mm nitrogen gap, provided a measured dose of 147 kGy in the 10 micrometer dosimeter, and a measured dose of 70 kGy in the 43.5 micrometer dosimeter.

example 11, which used a 12 μm titanium window and a 17 mm gap with a higher voltage of 114 kV and same current of 0.81 mA, achieved a measured dose of only 38 kGy in the 10 micrometer dosimeter and 32 kGy in the 43.5 micrometer dosimeter. These examples demonstrate that the shorter unit path length of the polyimide window/small gap as compared to the conventional titanium window/large gap shifts the absorption peak of the depth/dose curve away from the electron beam source toward the adhesive layer. This higher dose provided to the adhesive layer represents a more efficient use of the electron beam. The comparison also indicates that the low loss beam path results in a significantly higher surface to interface dose ratio. This is indicative of a desirable steeper depth/dose gradient through the backing layer.

TABLE 2

Targeted Interface Dose: 40 kGy

| Example | Gap Distance (mm) | Window Material | Voltage (kV) | Current (mA) | Depth (μm) | Calculated Dose (kGy) | Measured Dose (kGy) |
|---|---|---|---|---|---|---|---|
| 1 | 4 | Polyimide | 78 | 1.26 | 10 | 153 | 147 |
| | 4 | Polyimide | | | 43.5 | 87 | 70 |
| 2 | 4 | Polyimide | 80 | 1.02 | 10 | 124 | 121 |
| | 4 | Polyimide | | | 43.5 | 75 | 66 |
| 3 | 4 | Polyimide | 82 | 0.80 | 10 | 95 | 94 |
| | 4 | Polyimide | | | 43.5 | 63 | 48 |
| 4 | 4 | Polyimide | 87 | 0.53 | 10 | 64 | 53 |
| | 4 | Polyimide | | | 43.5 | 48 | 31 |
| 5 | 4 | Polyimide | 92 | 0.44 | 10 | 49 | 40 |
| | 4 | Polyimide | | | 43.5 | 42 | 32 |
| 6 | 4 | Polyimide | 101 | 0.43 | 10 | 43 | 45 |
| | 4 | Polyimide | | | 43.5 | 41 | 31 |
| 7 | 17 | Polyimide | 98 | 0.57 | 10 | 61 | 50 |
| | 17 | Polyimide | | | 43.5 | 47 | 38 |
| 8 | 17 | Polyimide | 116 | 0.45 | 10 | 42 | 40 |
| | 17 | Polyimide | | | 43.5 | 41 | 40 |
| 9 | 47 | Polyimide | 118 | 0.65 | 10 | 58 | 57 |
| | 47 | Polyimide | | | 43.5 | 45 | 49 |
| 10 | 47 | Polyimide | 139 | 0.49 | 10 | 42 | 39 |
| | 47 | Polyimide | | | 43.5 | 39 | 41 |
| CE 11 | 17 | Ti | 114 | 0.81 | 10 | 58 | 38 |
| | 17 | Ti | | | 43.5 | 45 | 32 |
| CE 12 | 17 | Ti | 146 | 0.58 | 10 | 45 | 36 |
| | 17 | Ti | | | 43.5 | 41 | 40 |

These results were achieved by using a 78 kV voltage and 1.26 mA current. Example 2 shows similar results with a 80 kV voltage and 1.02 mA current producing a measured dose of 121 kGy in the 10 micrometer dosimeter, and a measured dose of 66 kGy in the 43.5 micrometer dosimeter. The difference in measured dose at 10 versus 43.5 micrometers generally diminishes as the gap increases. For example, Example 10, which used a 47 mm gap with a 139 kV voltage and 0.49 mA current, shows that the measured doses at 10 and 43.5 micrometers were 39 and 41, respectively.

The contrast between using the polyimide window having a protective coating together with a small gap and using the 12 μm titanium window together with a larger gap is clearly indicated by comparing examples 3 and 11 of Table 2. In example 3, which used the polyimide window and a 4 mm gap, a voltage of 82 kV, and current of 0.80 mA produced a measured dose of 94 kGy in the 10 micrometer dosimeter and 45 kGy in the 43.5 micrometer dosimeter. In contrast, Tables 3, 4, and 5 show correlations similar to those in Tables 1 and 2. Tables 3, 4, and 5 generally demonstrate a high surface to interface dose ratio for the coating layer (approximated by the 10 micrometer dosimeter (surface) and 43.5 micrometer dosimeter (interface)) when the low loss electron beam path is used, especially at lower voltages. The tables also demonstrate increased energy efficiency when using the low loss electron beam path as indicated by the higher surface dose achieved as compared to the Comparative Examples, having similar current settings. For example, in Table 3, Example 7 uses the nominally 25 micrometer polyimide window and a current of 0.86 mA while Comparative Example 12 uses the conventional nominally 12 micrometer titanium window and a current of 0.88 mA. Example 7 requires a voltage of only 98 kV to achieve a measured surface dose (at 10 μm) of 97 kGy while Comparative Example 12 requires a voltage of 146 kV to achieve a measured surface dose of 53 kGy.

TABLE 3

Targeted Interface Dose of 60 kGy

| Example | Gap Distance (mm) | Window Material | Voltage (kV) | Current (mA) | Depth (μm) | Calculated Dose (kGy) | Measured Dose (kGy) |
|---|---|---|---|---|---|---|---|
| 1 | 4 | Polyimide | 78 | 1.89 | 10 | 229 | 266 |
| | 4 | Polyimide | | | 43.5 | 130 | 113 |
| 2 | 4 | Polyimide | 80 | 1.53 | 10 | 187 | 199 |
| | 4 | Polyimide | | | 43.5 | 113 | 100 |
| 3 | 4 | Polyimide | 82 | 1.20 | 10 | 143 | 153 |
| | 4 | Polyimide | | | 43.5 | 94 | 84 |
| 4 | 4 | Polyimide | 87 | 0.80 | 10 | 96 | 67 |
| | 4 | Polyimide | | | 43.5 | 73 | 51 |
| 5 | 4 | Polyimide | 92 | 0.66 | 10 | 74 | 69 |
| | 4 | Polyimide | | | 43.5 | 63 | 54 |
| 6 | 4 | Polyimide | 101 | 0.64 | 10 | 64 | 74 |
| | 4 | Polyimide | | | 43.5 | 62 | 62 |
| 7 | 17 | Polyimide | 98 | 0.86 | 10 | 91 | 97 |
| | 17 | Polyimide | | | 43.5 | 71 | 73 |
| 8 | 17 | Polyimide | 116 | 0.68 | 10 | 63 | 62 |
| | 17 | Polyimide | | | 43.5 | 62 | 61 |
| 9 | 47 | Polyimide | 118 | 0.98 | 10 | 87 | 85 |
| | 47 | Polyimide | | | 43.5 | 68 | 68 |
| 10 | 47 | Polyimide | 139 | 0.74 | 10 | 63 | 60 |
| | 47 | Polyimide | | | 43.5 | 59 | 66 |
| CE 11 | 17 | Ti | 114 | 1.22 | 10 | 87 | 57 |
| | 17 | Ti | | | 43.5 | 67 | 49 |
| CE 12 | 17 | Ti | 146 | 0.88 | 10 | 67 | 53 |
| | 17 | Ti | | | 43.5 | 62 | 64 |

TABLE 4

Targeted Interface Dose of 80 kGy

| Example | Gap Distance (mm) | Window Material | Voltage (kV) | Current (mA) | Depth (μm) | Calculated Dose (kGy) | Measured Dose (kGy) |
|---|---|---|---|---|---|---|---|
| 1 | 4 | Polyimide | 78 | 2.52 | 10 | 305 | 350 |
| | 4 | Polyimide | | | 43.5 | 173 | 143 |
| 2 | 4 | Polyimide | 80 | 2.04 | 10 | 249 | 293 |
| | 4 | Polyimide | | | 43.5 | 150 | 139 |
| 3 | 4 | Polyimide | 82 | 1.60 | 10 | 190 | 231 |
| | 4 | Polyimide | | | 43.5 | 125 | 110 |
| 4 | 4 | Polyimide | 87 | 1.08 | 10 | 128 | 134 |
| | 4 | Polyimide | | | 43.5 | 97 | 90 |
| 5 | 4 | Polyimide | 92 | 0.88 | 10 | 98 | 105 |
| | 4 | Polyimide | | | 43.5 | 84 | 82 |
| 6 | 4 | Polyimide | 101 | 0.84 | 10 | 84 | 97 |
| | 4 | Polyimide | | | 43.5 | 81 | 87 |
| 7 | 17 | Polyimide | 98 | 1.16 | 10 | 123 | 119 |
| | 17 | Polyimide | | | 43.5 | 96 | 82 |
| 8 | 17 | Polyimide | 116 | 0.92 | 10 | 85 | 92 |
| | 17 | Polyimide | | | 43.5 | 84 | 80 |

TABLE 5

Targeted Interface Dose: 100 kGy

| Example | Gap Distance (mm) | Window Material | Voltage (kV) | Current (mA) | Depth (μm) | Calculated Dose (kGy) | Measured Dose (kGy) |
|---|---|---|---|---|---|---|---|
| 1 | 4 | Polyimide | 78 | 3.15 | 10 | 381 | 440 |
| | 4 | Polyimide | | | 43.5 | 216 | 165 |
| 2 | 4 | Polyimide | 80 | 2.55 | 10 | 311 | 378 |
| | 4 | Polyimide | | | 43.5 | 187 | 177 |
| 3 | 4 | Polyimide | 82 | 2.00 | 10 | 237 | 286 |
| | 4 | Polyimide | | | 43.5 | 156 | 157 |
| 4 | 4 | Polyimide | 87 | 1.35 | 10 | 160 | 176 |
| | 4 | Polyimide | | | 43.5 | 121 | 115 |
| 5 | 4 | Polyimide | 92 | 1.10 | 10 | 123 | 137 |
| | 4 | Polyimide | | | 43.5 | 105 | 100 |

TABLE 5-continued

Targeted Interface Dose: 100 kGy

| Example | Gap Distance (mm) | Window Material | Voltage (kV) | Current (mA) | Depth (μm) | Calculated Dose (kGy) | Measured Dose (kGy) |
|---|---|---|---|---|---|---|---|
| 6 | 4 | Polyimide | 101 | 1.05 | 10 | 105 | 119 |
| | 4 | Polyimide | | | 43.5 | 102 | 113 |
| 7 | 17 | Polyimide | 98 | 1.45 | 10 | 153 | 158 |
| | 17 | Polyimide | | | 43.5 | 120 | 105 |
| 8 | 17 | Polyimide | 116 | 1.15 | 10 | 107 | 116 |
| | 17 | Polyimide | | | 43.5 | 104 | 104 |

In addition to the dosimetry measurements, samples of irradiated masking tape were analyzed for performance characteristics. After irradiation, the adhesive side of the samples was immediately covered with the low adhesion backsize side of a tape backing. All samples were stored in a constant humidity/temperature room (50% relative humidity, 21° C.) for a minimum of 48 hours before being tested. The samples were tested in accordance with the following standardized tests:

(1) MIT flex test. Tests were conducted on a 12.5 mm wide strip of tape using an MIT Flex Tester Model #1 made by Tinius Olsen Testing Machine Company of Willow Grove, Pa. The sample was mechanically flexed under a tension from a suspended weight of 1.5 kg until the tape broke. Each reported result is an average of 3 measurements with the reported result having a variability of +/−20 percent. Degradation of the backing was measured by comparing the number of flex repetitions to failure to that of an unirradiated saturated and strengthened crepe paper backing. An unirradiated backing typically survives 1200 flexes. A flex repetition of 900 to 1200 was considered very good with substantially no degradation present. Tape having a flex repetition of between 900 and 600 was considered satisfactory for many current applications. Tape having a flex repetitions of between 600 and 300 was considered satisfactory for some current applications such as removing the tape from a substrate without its breaking or tearing. Tape having a flex repetition rate of below 300 was considered unacceptably brittle for most applications.

(2) 5-bond test. The 5-bond test measures the cohesive strength of an adhesive by means of a hanging shear test. Two 12.5-mm wide strips of tape were joined on their adhesive sides over a 12.5-mm length. A 4.4 kg roller was then passed six times over the joined area. The joined strips were then mounted vertically in a jig with a 1000 gram weight attached to and suspended from the lower end of the sample. The time it took for the strips to separate was measured (in minutes). Tests were terminated any time after 5000 minutes. For adhesive-backing combinations used in this study, times over 400 minutes generally indicate satisfactory crosslinking and under times 400 minutes generally indicate unsatisfactory (not enough) crosslinking.

(3) Holding power. The holding power test measures the time it takes for a tape, having a specified weight attached, to separate from a polished stainless steel plate held in a horizontal position. One end (10 cm long) of a 15 cm long by 19.1 mm wide tape was attached to the plate by passing a 9.9 kg roller over the 10 cm section six times. The plate with tape was then mounted horizontally with the free tape end hanging down to create a 90 degree peel angle. A 200 gram weight was attached to the free tape end. The time it took for the tape to separate from the plate was measured (in minutes). A holding time of at least 30 minutes was judged satisfactory.

The reported results of the above tests were each an average of three measurements.

It is desirable to obtain high values for the MIT Flex Test, 5 Bond, and Holding Power Data. High values indicate that the tested samples are flexible and have high bond strength.

Table 6, below, provides MIT flex test data for masking tape samples. As described in the beginning of the Examples section, the masking tape comprised an adhesive coating on a fabric backing. The tape constructions were irradiated in a nitrogen atmosphere using the window materials, gap distances, voltages and currents shown in Tables 1 through 5. The MIT flex test results shown in Table 6 demonstrate that the flex property of the tape samples was sensitive to both the depths of the electron beam penetration (which directly correlates to voltage levels) and to the intensity of the radiation (which directly correlates to dose levels). As seen in Table 6, the most favorable results correlated a 4 mm gap and a nominally 25 μm polyimide window used with voltages of under 100 kV and particularly under 80 kV at interface doses of 20 to 60 kGy. Table 6 also shows that even at a targeted interface dose of 100 kGy, the MIT Flex Test numbers were generally between 1000 and 600. Table 6 further indicates that a targeted interface dose of as little as 20 kGy produced satisfactory adhesive tape from the adhesive and backing material used.

TABLE 6

MIT Flex Data at Various Dosage

| Apparatus | | | Interface Dosage | | | | |
|---|---|---|---|---|---|---|---|
| Gap (mm) | Window (material) | Voltage (kV) | 20 (kGy) | 40 (kGy) | 60 (kGy) | 80 (kGy) | 100 (kGy) |
| | | | Cycle Numbers | | | | |
| 4 | polyimide | 78 | 1212 | 1171 | 873 | 831 | 967 |
| 4 | polyimide | 80 | 1123 | 902 | 952 | 618 | 757 |
| 4 | polyimide | 82 | 868 | 874 | 908 | 796 | 706 |
| 4 | polyimide | 87 | 1080 | 893 | 882 | 857 | 826 |
| 4 | polyimide | 92 | 807 | 1098 | 1003 | 826 | 606 |
| 17 | polyimide | 98 | 804 | 857 | 778 | 755 | 705 |
| 4 | polyimide | 101 | 895 | 1093 | 909 | 575 | 493 |
| 17 | titanium | 114 | 920 | 982 | 844 | — | — |
| 17 | polyimide | 116 | 851 | 608 | 537 | 461 | 442 |
| 47 | polyimide | 118 | 860 | 748 | 648 | — | — |
| 47 | polyimide | 139 | 769 | 558 | 405 | — | — |
| 17 | titanium | 146 | 728 | 495 | 343 | — | — |

Table 7 tabulates the data illustrated in FIG. 5. The currents of the generated depth/dose curves were adjusted to provide an interface dose of 20 kGy for a low loss path using a 4 mm nitrogen gap and a 27 μm (nominally 25 μm) thick polyimide window having a 36 gsm unit path length. To obtain the 20 kGy interface dose without excessively modifying the adhesive surface, e.g., overcrosslinking, 78 kV was the lowest practical voltage because a lower voltage would create a surface to interface dose ratio greater than 5 to 1, which could cause excessive modification of the surface. At a 78 kV voltage, there was no detectable paper degradation as indicated by the MIT Flex Test Cycle Number of 1212. As the voltage was increased for the same combination of window, gap, and interface dose, the general trend of the Flex Test Numbers decreased, indicating an increase in backing degradation. Backing degradation generally increased as voltage increased and as the gap was changed from 4 mm to 17 mm, then 47 mm, which is near the 50 mm gap typical of commercially available electron beams. Backing degradation was also higher when a conventional 14 micrometer thick titanium window was used (at voltages of 114 and 146 kV) with a 17 mm gap.

Degradation, as represented by the Flex Test Numbers of Table 7 roughly correlate to total energy deposited in the first 30 micrometers of the backing material. Total energy deposited is represented by the area under the depth/dose curve of FIG. 5. As seen in Table 7, energy absorption on the order of about 11.2 mJ/cm$^2$ over the first 30 micrometers of the backing produced no degradation. When about 25 to 35 mJ/cm$^2$ were absorbed over this same distance, the degradation became more significant (with flex numbers decreasing to about 700 to 800 cycles). Therefore, it is preferable to keep the energy absorbed within the first 30 μm of the backing layer below about 40 mJ/cm$^2$.

TABLE 7

Backing Energy Absorption vs. Flex Test Numbers

| window (actual thickness) | gap mm | voltage kV | energy mJ/cm$^2$ | MIT Flex Number |
|---|---|---|---|---|
| 27 micron polyimide | 4 | 78 | 11.2 | 1212 |
| 27 micron polyimide | 4 | 80 | 12.7 | 1123 |
| 27 micron polyimide | 4 | 82 | 15.7 | 868 |
| 27 micron polyimide | 4 | 87 | 21.3 | 1080 |
| 27 micron polyimide | 4 | 92 | 25.4 | 807 |
| 27 micron polyimide | 4 | 101 | 32.1 | 895 |
| 27 micron polyimide | 17 | 98 | 25.1 | 804 |
| 27 micron polyimide | 17 | 116 | 34.5 | 851 |
| 27 micron polyimide | 47 | 118 | 27.5 | 860 |
| 27 micron polyimide | 47 | 139 | 33.7 | 769 |
| 14 micron titanium | 17 | 114 | 27.4 | 920 |
| 14 micron titanium | 17 | 146 | 34.5 | 728 |

Table 8 provides 5-bond test data. The 5-bond results were a function of interface dose independent of voltage. As dose was increased, 5-bond results increased under all window, gap, and voltage conditions, until the results eventually exceeded 5000 minutes. Testing was terminated after the sample exceeded 5000 minutes. Hence, Table 8 indicates that the 5-bond property of a tape can be controlled by adjusting voltage at a constant target interface dose. A dose of 20 kGy was usually sufficient to produce results of about 500 minutes and a dose of 40 kGy was usually sufficient to produce results of about 5,000 minutes

TABLE 8

5 Bond Data

| Apparatus | | | Interface Dosage | | | | |
|---|---|---|---|---|---|---|---|
| Gap (mm) | Window (material) | Voltage (kV) | 20 (kGy) | 40 (kGy) | 60 (kGy) | 80 (kGy) | 100 (kGy) |
| | | | Minutes to Fail | | | | |
| 4 | polyimide | 78 | 742 | 4390 | 4844 | 5000+ | 5000+ |
| 4 | polyimide | 80 | 1716 | 5000+ | 5000+ | 5000+ | 5000+ |
| 4 | polyimide | 82 | 670 | 3553 | 5000+ | 5000+ | 5000+ |
| 4 | polyimide | 87 | 235 | 1220 | 4865 | 5000+ | 5000+ |
| 4 | polyimide | 92 | 314 | 1326 | 5000+ | 5000+ | 5000+ |
| 17 | polyimide | 98 | 258 | 4253 | 5000+ | 5000+ | 5000+ |
| 4 | polyimide | 101 | 626 | 3372 | 5000+ | 5000+ | 5000+ |
| 17 | titanium | 114 | 330 | 1485 | 5000+ | — | — |
| 17 | polyimide | 116 | 618 | 3730 | 5000+ | 5000+ | 5000+ |
| 47 | polyimide | 118 | 675 | 2816 | 5000+ | — | — |
| 47 | polyimide | 139 | 516 | 3192 | 5000+ | — | — |
| 17 | titanium | 146 | 210 | 5000+ | 5000+ | — | — |

Table 9 provides holding power test results. As expected, holding power appeared to be very sensitive to surface dose. Increasing the targeted interface dose, which also increased surface dose lowered the holding power. The general data trend shows that lower holding power correlates to higher interface dosage. As seen in Tables 1 to 5, voltages below about 92 kV can introduce a high surface dose relative to interface dose. This can cause the surface to be over-modified, e.g., over-cured or over-crosslinked, which can result in low holding power.

TABLE 9

Holding Power Data

| Apparatus | | | Interface Dosage | | | | |
|---|---|---|---|---|---|---|---|
| Gap (mm) | Window (material) | Voltage (kV) | 20 (kGy) | 40 (kGy) | 60 (kGy) | 80 (kGy) | 100 (kGy) |
| | | | Minutes to Fail | | | | |
| 4 | polyimide | 78 | 64 | 26 | 25 | 7 | 5 |
| 4 | polyimide | 80 | 14 | 12 | 8 | 5 | 6 |
| 4 | polyimide | 82 | 60 | 38 | 23 | 9 | 7 |
| 4 | polyimide | 87 | 99 | 82 | 45 | 18 | 10 |
| 4 | polyimide | 92 | 130 | 63 | 47 | 19 | 16 |
| 17 | polyimide | 98 | 128 | 74 | 45 | 18 | 13 |
| 4 | polyimide | 101 | 93 | 67 | 54 | 15 | 15 |
| 17 | titanium | 114 | 110 | 114 | 74 | — | — |
| 17 | polyimide | 116 | 107 | 80 | 42 | 17 | 17 |
| 47 | polyimide | 118 | 100 | 78 | 58 | — | — |
| 47 | polyimide | 139 | 65 | 72 | 68 | — | — |
| 17 | Titanium | 146 | 83 | 111 | 76 | — | — |

The data from Tables 6, 8 and 9 indicate that a broad range of voltage/dose combinations for low loss paths can produce a masking tape that satisfies performance requirements. A low loss beam path at voltages as low as 90 kV or less can provide tape properties that exceed minimum requirements for most applications.

Other embodiments of the invention are within the scope of the following claims. It is intended that the specification and examples be considered as exemplary only, with the full scope and spirit of the invention being indicated by the following claims.

We claim:

1. A method of irradiating an article with an electron beam said article comprising a coating that can be modified by electron beam radiation on a substrate that can be degraded by electron beam radiation passing through the coating, said article being oriented so that the coating faces the electron beam, said method comprising:

providing an electron beam source;

providing a window for use with the electron beam source, the window comprising a polymeric film having at least two surfaces and a protective layer resistant to free radical degradation on at least one of the surfaces, said window having a unit path length of 3–54 $g/m^2$; and irradiating the article through the window with electrons from the electron beam source, the electron beam source having an energy of between about 30 and 150 keV before passing through the window, and the intensity of the electron beam radiation being sufficient to modify the coating, wherein the parameters of the method, such as the gap between the window and the article, unit path length of the window, coating thickness, and electron beam source energy are set so that the intensity of electron beam radiation received by the surface of the coating facing the electron beam is between 1 and 5 times greater than the intensity of electron beam radiation received by the surface of the coating facing the substrate.

2. The method of claim 1, in which the coating on the article is an adhesive polymer that can be cross-linked by electron beam radiation.

3. The method of claim 1, in which the substrate is made of a material selected from the group consisting of paper, fabric, polyvinylchloride, polypropylene, and polytetrefluoroethylene.

4. The method of claim 1, wherein the electron beam source has an energy of between about 50 and 100 keV, and the polymeric film of the window is made of a material selected from the group consisting of polyimides, aromatic amides, polystyrenes, polysulfones, polyphenylene sulfides, polyetherimides, and polyurethanes.

5. A method of modifying the properties of an article having two or more layers comprising:

providing an article having an electron beam modifiable first layer and an electron beam degradable second layer located so that radiation passing through the first layer would be received by the second layer;

providing an electron beam source for which energy, voltage, and current levels may be adjusted;

providing a window between the electron beam source and the article to be irradiated, wherein a gap of from 2 to 50 millimeters exists between the window and article, the window having a unit path length of 3 to 54 grams per square meter, setting the electron beam source energy to between 50 and 130 keV before passing through the window; and irradiating the first layer of the article with an electron beam from the electron beam source with the parameters of the method, such as gap, unit path length of the window, coating thickness and electron beam source energy, set so that the intensity of electron beam radiation received by the surface of the first layer facing the electron beam is between 1 and 5 times greater than the intensity of electron beam radiation received by the surface of the first layer facing the second layer.

6. The method of claim 4 wherein the window is comprised of a material selected from the group consisting of polyimide, aluminum titanium, beryllium, silicon, silicon nitride, and boron nitride.

7. The method of claim 4 wherein first layer is an electron beam cross-linkable adhesive polymer.

8. The method of claim 4 wherein the gap between the window and the article is between about 4 and 20 millimeters.

9. The method claim 7 wherein the electron beam cross-linkable adhesive polymer is a pressure-sensitive adhesive after cross-linking, and the substrate is suitable for making a pressure-sensitive adhesive tape.

10. The method of claim 4 wherein the first layer is modified by sequential exposure to at least two electron beams sources.

11. The method of claim 10 wherein at least two electron beams have different voltages.

* * * * *

UNITED STATES PATENT AND TRADEMARK OFFICE

CERTIFICATE OF CORRECTION

PATENT NO. : 6,749,903 B2
DATED : June 15, 2004
INVENTOR(S) : Weiss, Douglas E.

It is certified that error appears in the above-identified patent and that said Letters Patent is hereby corrected as shown below:

Title page,
Item [56], References Cited, FOREIGN PATENT DOCUMENTS, delete “WO WO 94/07248 3/1994”
OTHER PUBLICATIONS, “Radiation-Chemical Curing Systems” reference, delete “Accellerators” and insert in place thereof -- Accelerators --
“Wakalopulos, G.” reference, delete “Beam.” and insert in place thereof -- Beam: --
“Anderson, R.G., Shurter, R.P., Rose E.A.” reference, delete “1984” and insert in place thereof -- 1989 --

Column 9,
Line 13, delete “releief” and insert in place thereof -- relief --
Line 16, delete “micromters” and insert in place thereof -- micrometers --

Column 10,
Line 3, delete “profile profile” and insert in please thereof -- profile --

Column 20,
Table 2, delete “Targeted” and insert in place thereof -- Target --

Column 21,
Table 3, delete “Targeted” and insert in place thereof -- Target --

Column 23,
Table 34, delete “crepe” and insert in place thereof -- crèpe --

UNITED STATES PATENT AND TRADEMARK OFFICE

CERTIFICATE OF CORRECTION

PATENT NO. : 6,749,903 B2
DATED : June 15, 2004
INVENTOR(S) : Weiss, Douglas E.

It is certified that error appears in the above-identified patent and that said Letters Patent is hereby corrected as shown below:

Column 28,
Lines 24, 28, 31 and 38, delete "claim 4" and insert in place thereof -- claim 5 --
Line 26, delete "aluminum" and insert in place thereof -- aluminum, --

Signed and Sealed this

Nineteenth Day of July, 2005

JON W. DUDAS
*Director of the United States Patent and Trademark Office*